US012117575B2

(12) United States Patent
Williamson et al.

(10) Patent No.: US 12,117,575 B2
(45) Date of Patent: Oct. 15, 2024

(54) SEISMIC SOURCE APPARATUS

(71) Applicant: TGS-NOPEC Geophysical Company, Houston, TX (US)

(72) Inventors: Kenneth Graeme Williamson, Houston, TX (US); Paul Farmer, Houston, TX (US); Joseph Richard Gagliardi, Katy, TX (US); Nikolaos Bernitsas, Sugar Land, TX (US); Timothy A. Dudley, Houston, TX (US); Emerson Verissimo, Houston, TX (US); Darrell Burch, Houston, TX (US)

(73) Assignee: TGS-NOPEC Geophysical Company, Houston, TX (US)

( * ) Notice: Subject to any disclaimer, the term of this patent is extended or adjusted under 35 U.S.C. 154(b) by 0 days.

(21) Appl. No.: 18/103,922

(22) Filed: Jan. 31, 2023

(65) Prior Publication Data

US 2023/0251394 A1      Aug. 10, 2023

Related U.S. Application Data

(63) Continuation of application No. 16/904,188, filed on Jun. 17, 2020, now abandoned.

(Continued)

(51) Int. Cl.
*G01V 1/137* (2006.01)
*G01V 1/38* (2006.01)

(52) U.S. Cl.
CPC ............ *G01V 1/137* (2013.01); *G01V 1/3808* (2013.01)

(58) Field of Classification Search
CPC ............................. G01V 1/137; G01V 1/3808
See application file for complete search history.

(56) References Cited

U.S. PATENT DOCUMENTS 3,349,367 A * 10/1967 Wisotsky ................ G10K 9/10
                                                          181/120
4,858,205 A *  8/1989 Harrison ................ G01V 1/006
                                                          181/120

(Continued)

FOREIGN PATENT DOCUMENTS

EP            0393261 A1 * 10/1990    ............. G01V 1/387
WO    WO-2022031786 A1 *  2/2022    ............... G01V 1/04

OTHER PUBLICATIONS

European Patent Office, Communication pursuant to Article 94(3) EPC for Application No. 20 737 663.3-1001, dated Mar. 3, 2023.

(Continued)

*Primary Examiner* — S. Joseph Morano
*Assistant Examiner* — Jovon E Hayes
(74) *Attorney, Agent, or Firm* — Sage Patent Group

(57) ABSTRACT

The embodiments herein describe a seismic source that includes at least two firing heads connected to a shared reservoir of compressed gas. When underwater, a controller can instruct the firing heads to fire at the same time or at different times to create gas bubbles that generate seismic energy for identifying structures underneath a body of water. If the firing heads fire at the same, the resulting gas bubble may coalesce to form a single bubble, depending on the size of the respective bubbles and the separation distance between the firing heads. In one embodiment, the firing heads are attached at opposite ends of the shared reservoir (although this is not a requirement). The length of the reservoir, which dictates in part the separation distance of the firing heads, can be set so that gas bubbles generated by the firing heads at substantially the same time coalesce.

18 Claims, 17 Drawing Sheets

Related U.S. Application Data

(60) Provisional application No. 62/862,378, filed on Jun. 17, 2019.

(56) References Cited

U.S. PATENT DOCUMENTS

| | | | | |
|---|---|---|---|---|
| 5,185,726 | A * | 2/1993 | Curto | G01V 1/137 |
| | | | | 367/20 |
| 6,539,308 | B2 * | 3/2003 | Monk | G01V 1/36 |
| | | | | 702/14 |
| 9,025,417 | B2 * | 5/2015 | Hopperstad | G01V 1/3861 |
| | | | | 181/120 |
| 9,360,578 | B2 * | 6/2016 | Hopperstad | G01V 1/3861 |
| 2020/0393583 | A1 * | 12/2020 | Williamson | G01V 1/3808 |
| 2022/0043173 | A1 * | 2/2022 | Burch | G01V 1/137 |

OTHER PUBLICATIONS

Krail, P.M.; "Airguns: Theory and Operation of the Marine Seismic Source"; Course notes for GEO-391, Principles of Seismic Data Acquisition; University of Texas at Austin; 2010.

* cited by examiner

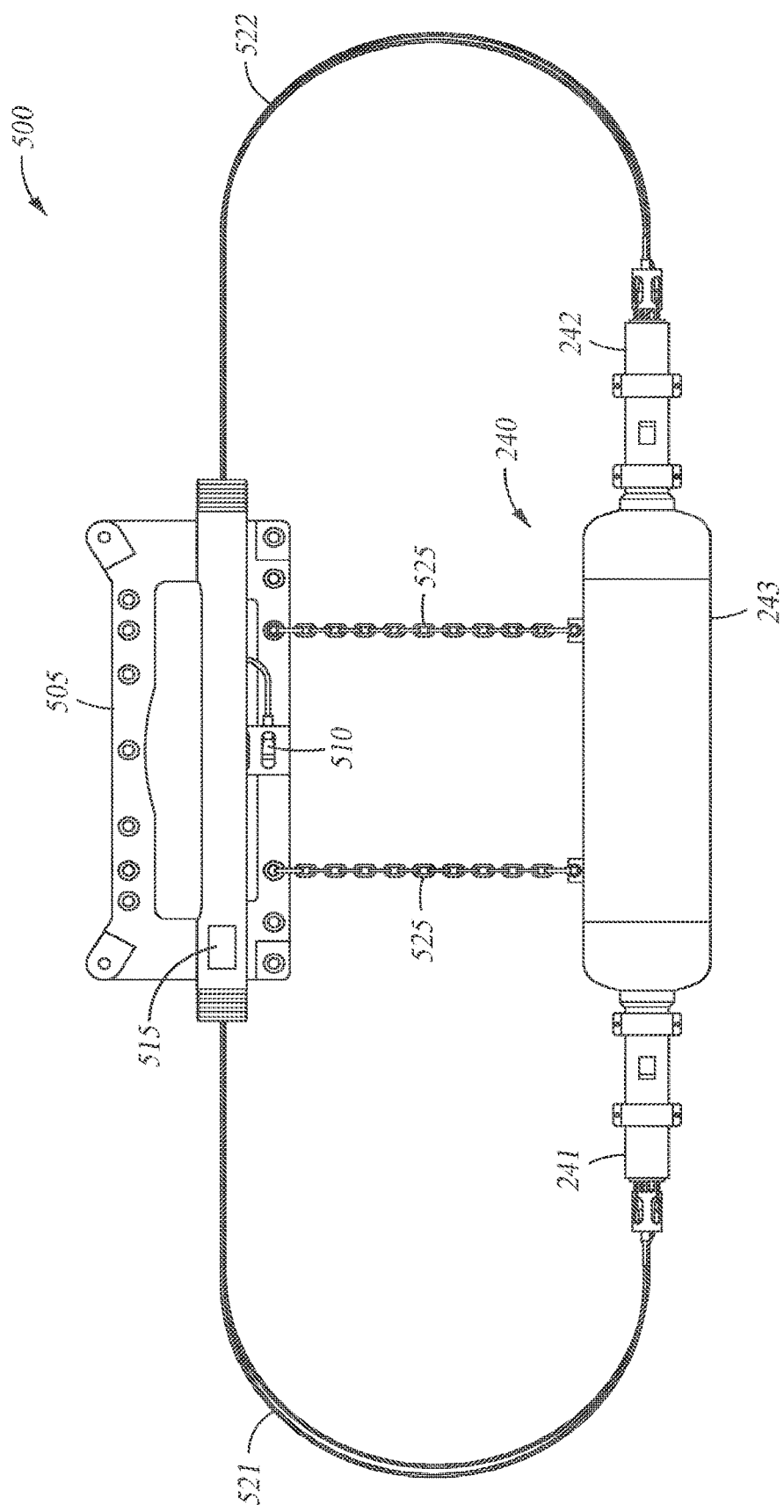

SEISMIC SOURCE APPARATUS

CROSS-REFERENCE TO RELATED APPLICATIONS

This application is a continuation of U.S. patent application Ser. No. 16/904,188, filed Jun. 17, 2020, entitled SEISMIC SOURCE APPARATUS, and U.S. Provisional Patent Application No. 62/862,378, filed Jun. 17, 2019, entitled SEISMIC SOURCE APPARATUS. The aforementioned related patent applications are herein incorporated by reference in their entirety.

BACKGROUND

This application relates to geophysical exploration and seismic data acquisition, including seismic source technologies. Applications include, but are not limited to, seismic sources systems for marine seismic surveys, seismic data acquisition, and geophysical image generation.

In marine seismic exploration, a sensor array is commonly towed behind a marine vessel. A series of hydrophones (or pressure sensors) and motion sensors (or accelerometers) are deployed along one or more ropes or cables, and configured to sense seismic energy propagating through the water column. Alternatively, the sensors can be deployed along ocean-bottom cables, or in autonomous seismic sensor nodes distributed on the seabed, or suspended at depth below the surface.

The seismic energy is typically produced by seismic sources configured to generate periodic bursts of seismic energy. The sources can be deployed by the same seismic vessel that tows streamers, or by designated source vessels. The seismic energy generated by the sources propagates down through the water column in the form of acoustic waves, which can penetrate the seafloor and reflect from subsurface structures.

The reflected seismic energy is detected at the seismic sensor locations, in the form of an upward-propagating seismic wavefield. The sensors produce seismic data by sampling the seismic wavefield, and the data are processed to generate seismic images of the underlying structures.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 illustrates a sensor system that includes a shared-reservoir seismic source attached to a control plate in accordance with embodiments of the disclosure.

To facilitate understanding, identical reference numerals have been used, where possible, to designate identical elements that are common to the figures. It is contemplated that elements disclosed in one embodiment may be beneficially used in other embodiments without specific recitation.

SUMMARY

Figure 1:
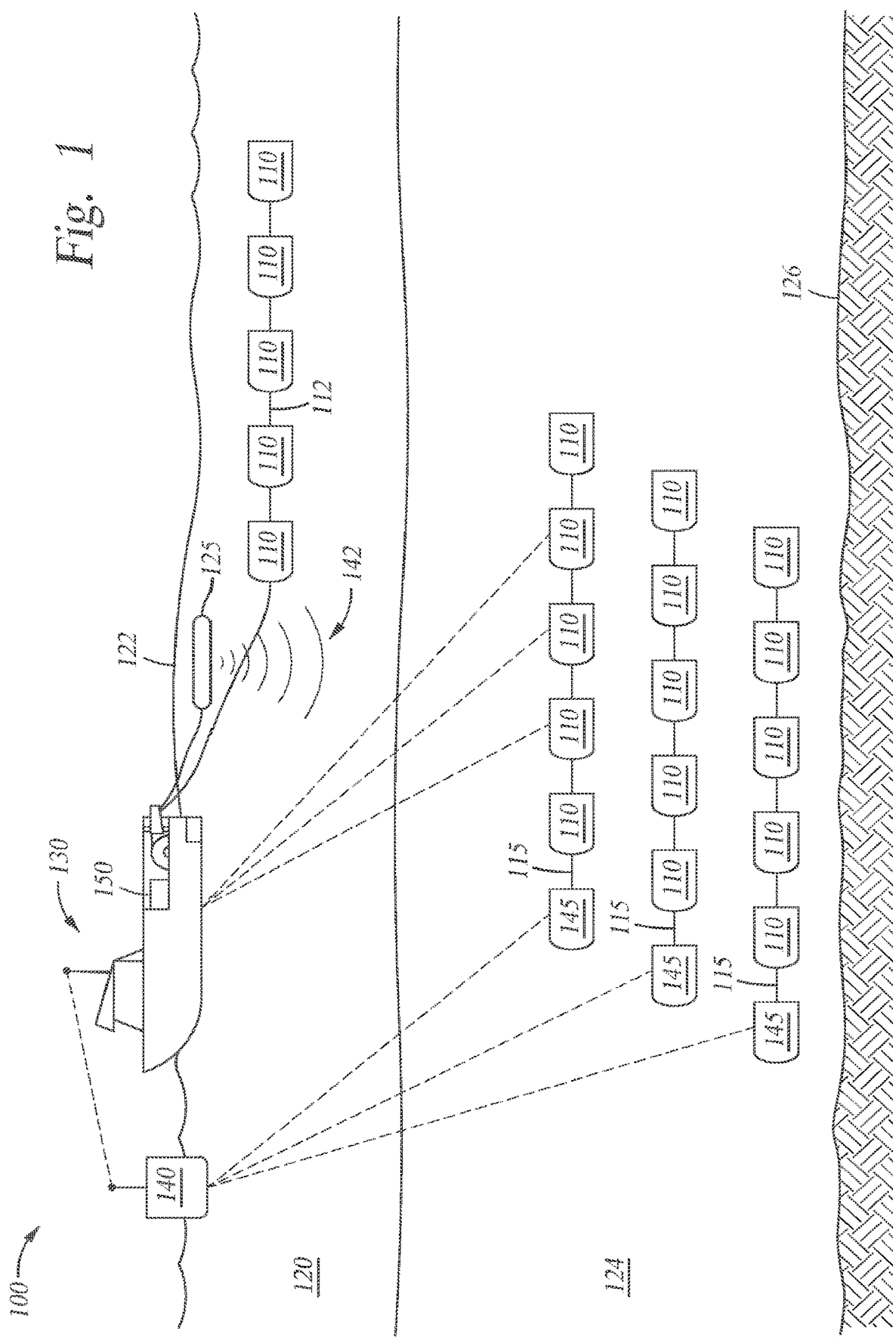
FIG. 1 is a schematic illustration of a representative marine seismic survey in accordance with embodiments of the disclosure.

One embodiment presented in this disclosure is a seismic source that includes a reservoir configured to hold compressed gas, a first firing head coupled to the reservoir, the first firing head configured to generate seismic energy by releasing a first portion of the compressed air from the reservoir to form a first gas bubble in a seismic medium, and a second firing head coupled to the reservoir, the second firing head configured to generate seismic energy by releasing a second portion of the compressed gas from the reservoir to form a second gas bubble in the seismic medium. Moreover, the reservoir comprises a baffle dividing the reservoir into a first sub-chamber containing the first portion of the compressed gas and a second sub-chamber containing the second portion of the compressed gas.

Another embodiment described herein is a seismic source that includes a reservoir configured to hold compressed gas, a first firing head coupled to the reservoir, the first firing head configured to generate seismic energy by releasing a first portion of the compressed gas from the reservoir to form a first gas bubble in a seismic medium, and a second firing head coupled to the reservoir, the second firing head configured to generate seismic energy by releasing a second portion of the compressed gas from the reservoir to form a second gas bubble in the seismic medium. Moreover, the first and second firing heads are separated by a distance of at least one meter.

Another embodiment described herein is a method that includes generating seismic energy using a first firing head by releasing a first portion of compressed air stored in a reservoir to form a first gas bubble in a seismic medium and generating seismic energy using a second firing head by releasing a second portion of compressed air stored in the reservoir to form a second gas bubble in the seismic medium. Moreover, the reservoir comprises a baffle dividing the reservoir into a first sub-chamber containing the first portion of the compressed gas and a second sub-chamber containing the second portion of the compressed gas.

DETAILED DESCRIPTION

In this disclosure, reference is made to examples and embodiments of the disclosure. It should be understood that the claims are not limited to these specifically described examples, and any combination of the following features and elements is contemplated to implement and practice embodiments of the disclosure, as recited in the claims, and as described in terms of the embodiments disclosed herein. Although the various features of the disclosure may provide certain advantages over the prior art, and over other possible solutions to the problems addressed herein, whether or not such advantages are achieved does not limit the disclosure to a given embodiment. The following aspects, features and advantages of the disclosure are merely illustrative, and are not to be construed as features or limitations of the claims, except where explicitly recited therein. References to "the disclosure" shall not be construed as a generalization of any of the subject matter that is disclosed, and do not limit the claims except where the relevant features are expressly stated.

The embodiments herein describe a seismic source that includes at least two firing heads connected to a shared reservoir that can have one, two, three or more chambers of compressed gas. As used herein, compressed gas includes any compressed gas, whether a single gaseous element or a combination of gaseous elements. For purposes of illustration, embodiments are described herein with reference to compressed air, as one example of a compressed gas. When underwater, a controller can instruct the firing heads to fire at the same time or at different times to create air bubbles that generate seismic energy for identifying structures underneath a body of water. If the firing heads fire at the same time or substantially the same time (e.g., within a half a second of each other), the resulting air bubbles may coalesce to form a single bubble, depending on the size of the respective bubbles and the separation distance between the firing heads. In one embodiment, the firing heads are attached at opposite ends of the shared reservoir (although this is not a requirement). The length of the reservoir, which dictates in part the separation distance of the firing heads, can be set so that air bubbles generated by the firing heads at substantially the same time coalesce.

Further, the shared reservoir can include a baffle that subdivides the reservoir into separate chambers (referred to herein as sub-chambers) corresponding to the respective firing heads. In one embodiment, the pressure in the sub-chambers is equalized, which can be performed by controlling the amount of air pumped into the sub-chambers or including a pressure regulation feature in the baffle such as an aperture or valve that permits the pressure in the sub-chambers to equalize. One advantage of a baffle is that it prevents one firing head from using most of the compressed air in the shared reservoir if it fires before the other firing head. Stated differently, the baffle ensures the compressed air is better distributed between the two firing heads to generate air bubbles of generally the same size relative to shared reservoirs that do not have the baffle.

FIG. 1 is a schematic illustration of a representative seismic survey (or survey system) 100 in accordance with embodiments of the disclosure. The system 100 may include an array of seismic receivers 110 or autonomous nodes deployed to a water column 120 or similar seismic medium along one or more ropes or cables 112. Water column 120 extends from a top surface 122 to the ocean floor (e.g., a seabed 124) or other bottom surface, e.g., above a petroleum reservoir or other subsurface structure 126 of interest.

A shared-reservoir seismic source array 125 can be deployed behind seismic vessel 130, as described herein, either alone or in combination with an array of receivers 110 disposed along one or more towed ropes or cables 112, or node lines or streamers, using a suitably adapted seismic survey deployment system 150. Suitable seismic vessels 130 can also be configured to deploy receivers 110 to the seabed 124 or other bottom surface, e.g., with receivers 110 distributed along one or more ocean-bottom cables 115 disposed above a reservoir or other subsurface structure 126.

Receivers 110 can also be suspended at depth within water column 120, between top surface 122 and the ocean floor or seabed 124, or a combination of ocean bottom cables 115, towed receivers 110, and suspended receivers 110 can be deployed. A combination of manned, unmanned or autonomous vessels 130 can also be used for deployment, service, and recovery of the receivers 110 and shared-reservoir seismic source arrays 125 (e.g., shared-reservoir airgun arrays), in either surface or submersible configurations. For example, a remote operated vessel or remote operated underwater vessel (ROV) may be used.

Seismic receivers 110 (or nodes) can be configured for communications while deployed in water column 120, for example via a termination device or transponder 145 deployed along cable 115, with either a wired or wireless (e.g., acoustic, inductive or capacitive) data connection to a seismic hub 140 or buoy system. Wireless data communications can also be provided directly between individual receivers 110 and the seismic vessel 130, and between the seismic vessel 130 and one or more hubs 140, e.g., with a global positioning satellite (GPS) system or other navigational system to determine location and timing data for receivers 110. A suitably configured hub 140 or "master" node station/transponder 145 can also be provided with a high precision master dock, in order to synchronize timing information for the seismic receivers 110 disposed in the seismic array or survey system 100.

Seismic cables 115 encompass towed streamer, ocean bottom cable, and suspended cable embodiments, and suitable marine-based seismic system configurations may also include autonomous receivers 110. While references are made to water column 120 above a sea floor or seabed 124, in practice, the claims are not limited to any particular body of water or other seismic medium. Rather, receivers 110 and shared-reservoir seismic source arrays 125 may be deployed to any water or marine environment, including oceans, lakes, rivers, etc., and in other land-based or water-based seismic applications. Accordingly, use of the terms sea, seabed, sea floor, and the like should be broadly understood to encompass all bodies of water and all other seismic media, including subsurface, marine and land-based surfaces suitable for deployment of seismic receivers 110 adapted to detect propagating seismic energy produced by a shared-reservoir seismic source array 125.

One or more shared-reservoir seismic source arrays 125 can be configured to operate independently, or to emit seismic energy in a coordinated fashion at substantially the same time; e.g., according to a simultaneous source regime. Depending on embodiment, each of the shared chamber seismic source arrays 125 may include one or more low frequency seismic source components configured to generate the seismic energy, as described herein, so that the seismic wavefield propagates through the water column 120 or other medium in the form of acoustic waves 142.

For example, the shared-reservoir seismic source arrays 125 can be configured to generate acoustic waves 142 by emitting controlled blasts of compressed air, or other pneumatic, mechanical or electromechanical source components can be used. A portion of the acoustic waves 142 propagates down through water column 120 to penetrate the seabed 124, and reflects from a petroleum reservoir or other subsurface geological structure 126 of interest. A portion of the reflected seismic energy propagates back up to the seismic receivers 110 deployed along the seabed 124, or within the water column 120.

Reflections can also occur at top surface 122 and bottom surface (i.e., seabed 124) of water column 120, resulting in a combination of upward-propagating and downward-going seismic wavefield components. De-ghosting (as described in more detail below) can be applied to the resulting seismic data acquired by receivers 110, in order to improve image quality and resolution for geophysical exploration of the subsurface layers and other relevant geological structures 126.

Source Performance

For airgun source systems, the bubble period T of a single airgun source can be represented by:

$$T = \frac{(P \times V)^{1/3}}{C \times (P_0)^{5/6}} \tag{1}$$

where C is a constant parameter, e.g., according to the Rayleigh-Willis formula. The fundamental frequency F of a single-gun source can be represented by:

$$F = \frac{C \times (P_0)^{5/6}}{(P \times V)^{1/3}} \tag{2}$$

Where low frequency F or high period T are desired, or both, this can be achieved by selecting suitable operational parameters including, but not limited to, high charge pressure $P_0$ and large gun volume V, and operation of the source at shallow depths. However, a zero hertz notch can limit the effectiveness of this approach, and should be addressed to achieve the performance improvement attainable by selecting suitable values of the pressure and volume parameters, as described in the equations, and other operational parameters of the source. For example, large volume sources may be operated in a high pressure, tri-cluster design, at suitable depth in the water column. Thus, a high pressure, high volume, single or multiple source apparatus can be operated at suitable depth, in order to achieve desired results as described herein.

Figure 2:
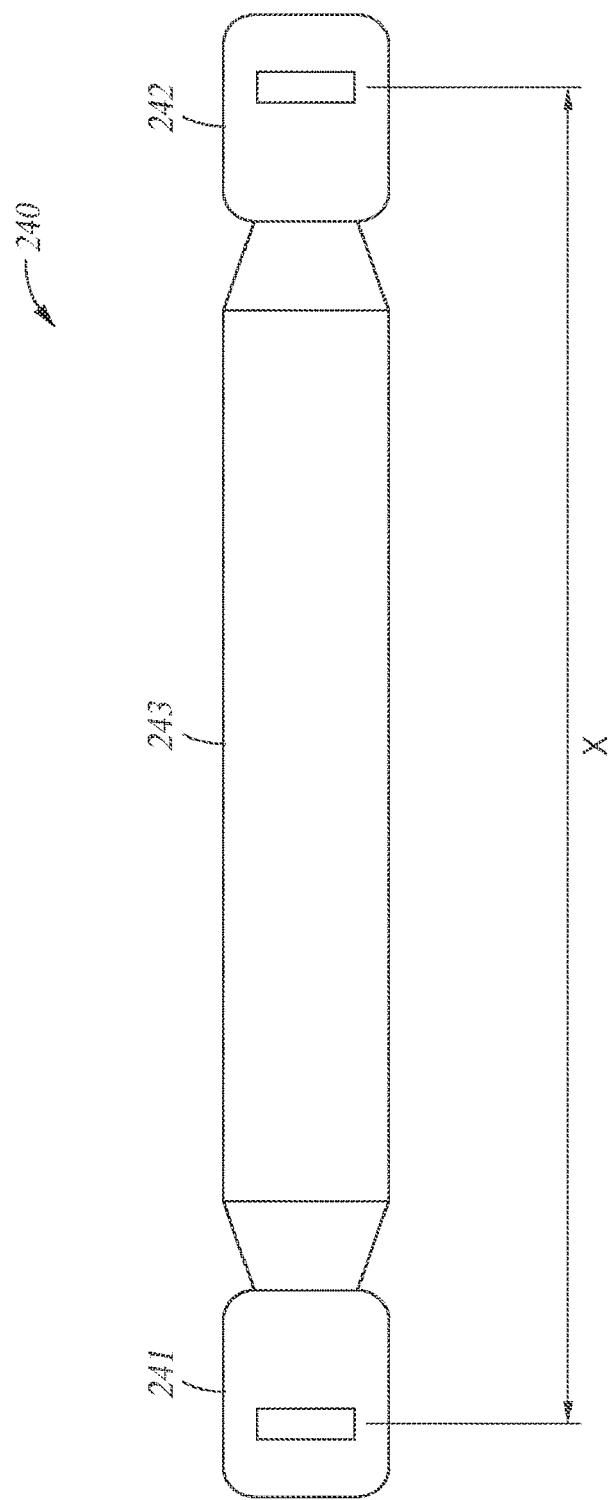
FIG. 2 includes a perspective view of a shared-reservoir seismic source in accordance with embodiments of the disclosure.

FIG. 2 includes a perspective view of a shared-reservoir seismic source 240 in accordance with embodiments of the disclosure. As shown in FIG. 2, the shared-reservoir seismic source 240 includes a first firing head (e.g., airgun) 241 and a second firing head 242 on opposite ends of a shared reservoir 243. Each of the firing heads 241, 242 may include a respective housing with one or more outlet ports, a respective solenoid valve assembly, and/or other types of triggering mechanisms. The one or more outlet ports may include one or more annular ports, in some examples. The shared reservoir 243 may serve as a shared reservoir chamber (e.g., fire chamber) for both of the first firing head 241 and the second firing head 242. The firing heads 241, 242 are in pressure communication with the shared reservoir 243 which provides compressed air to the firing heads 241 and 242 which then eject the compressed air from an outlet port during a firing sequence to generate respective air bubbles. The shared reservoir 243 can be provided as a gland type, a solid design, and/or with a radiused, threaded shaft shuttle and shuttle bearing.

Each of the first firing head 241 and the second firing head 242 may have respective firing characteristics, such as a single outlet port, more than one outlet port, a fixed air bubble volume, a configurable air bubble volume, a fixed firing pressure, a configurable firing pressure, a minimum recovery time between firings, or any combination thereof. In some examples, the respective firing characteristics of the first firing head 241 and the second firing head 242 may all be equivalent. In some examples, the respective firing characteristics of the firing head 241 and the firing head 242 may all be different. In some examples, the respective firing characteristics of the first firing head 241 and the second firing head 242 may include combinations of equivalent and different respective firing characteristics.

The firing head 241 and the firing head 242 may include individual control components (and/or the shared chamber seismic source 240 includes control circuitry) to allow the firing head 241 and the firing head 242 to be independently fired. That is, the firing head 241 and the firing head 242 may be fired simultaneously, sequentially or staggered (with a controlled delay between each firing), asynchronously, or any combination thereof. The control components and/or control circuitry may be configured to determine firing timing based on signals received via wired or wireless communication circuitry (e.g., from a towing or other vessel, control components of the other firing head, from another shared chamber seismic source array, etc., or combinations thereof), based on internal timing circuitry and programmed timing configurations or parameters, or any combination thereof.

In one embodiment, upon initial release, the bubble generated by each firing head 241, 242 has its own independent characteristics (frequencies, size, etc.), which then evolves as the bubbles interact or merge with each other and reach a steady state. By controlling the timing, frequency, and size of the bubbles, the seismic source 240 can create unique signatures by using different size different chamber volumes, introducing delays between activation of different heads, etc.

The control components may include electronic activation components, mechanical activation components, or any combination thereof. For example, the firing of the firing head 241 and the firing head 242 may be intentionally staggered, such as to account for delays in transmission or response times of different types of heads or to achieve a certain desired interaction between bubbles formed when the firing head 241 and the firing head 242 are fired (e.g., having the bubble coalesce).

The cylindrical or tubular frame or housing of the shared reservoir 243 may serve as a support system for the firing head 241 and the firing head 242. That is, the firing head 241 and the firing head 242 may be attached, affixed, mounted, etc., to the housing of the shared reservoir 243. Each of the firing heads 241, 242 may couple to a respective port of the shared reservoir 243 to receive compressed air. The cylindrical or tubular frame or housing of the shared reservoir 243 may include an inlet port to receive metered by air supply diameter, valves, or any other flow restriction mechanism or to receive unmetered compressed air from a compressed air source for refilling between firing sequences. In one embodiment, the cylindrical or tubular frame or housing of the shared reservoir 243 has insulation mechanisms to prevent heat transfer between the reservoir 243 and the water in which the source is submerged. In one embodiment, the cylindrical or tubular frame or housing of the shared reservoir 243 can be equipped with wired or autonomous sensors either externally or internally mounted to measure an environmental condition, e.g., pressure, temperature, humidity, depth, salinity, or any other sensing devices.

The shared reservoir 243 may have a length of X meters to provide a separation distance between the firing head 241 and the firing head 242. In some examples, the respective firing characteristics and relative compressed air discharge timing of each of the firing head 241 and the firing head 242, and the volume, the separation distance, and/or pressure of the shared reservoir 243 may be selected to achieve a particular effect between air bubbles fired from each of the firing heads 241, 242. That is, the seismic energy (e.g., including a frequency spectrum) generated by the shared-reservoir seismic source array 240 may be based on the separation distance between the firing heads 241 and 242, the relative compressed air discharge timing, and compressed air discharge volume provided from each of the firing heads 241 and 242.

Thus, in some examples, the separation distance may be selected to achieve a desired effect between air bubbles fired from the firing heads 241, 242. For example, the separation distance may be selected to result in the respective air bubbles coalescing when fired from the firing head 241 and the firing head 242. In another example, the separation distance may be selected to result in the respective air bubbles interacting but not coalescing when fired from the firing head 241 and the firing head 242. In yet another example, the separation distance may be selected to result in the respective air bubbles not interacting when fired from the firing head 241 and the firing head 242.

The length of X meters is at least 1 meter, in some examples. The length of X meters is 2 or more meters, in some examples. The length of X meters is approximately 2 meters, in some examples. The length of X meters is 5 or less meters in some examples.

In some examples, the shared reservoir 243 may include one or more baffles (e.g., or one or more other physical chamber dividers) that are configured to divide the reservoir into two or more separate sub-chambers. The two or more separate sub-chambers may be equal in volume, in some examples. In other examples, the two or more separate sub-chambers may be different in volume. In yet other examples where the shared reservoir 243 is divided into three or more separate sub-chambers, the three or more separate sub-chambers may include a combination of equal and different volumes.

In some examples, the one or more baffles (e.g., or one or more other physical chamber dividers) may include ports that may be selectively opened or closed based on a desired mode of operation, such as a first mode where the shared reservoir 243 is operated as a single shared chamber, a second mode where the shared reservoir 243 is split into two separate shared sub-chambers, or other modes of operation where the shared reservoir 243 is split into three or more separate shared sub-chambers.

When the shared reservoir 243 is divided into two or more different sub-chambers, each individual sub-chamber may be independently filled with compressed air to a respective pressure. The respective pressure stored in each of the two or more different sub-chambers may be different, equivalent, or combinations thereof.

Figure 3:
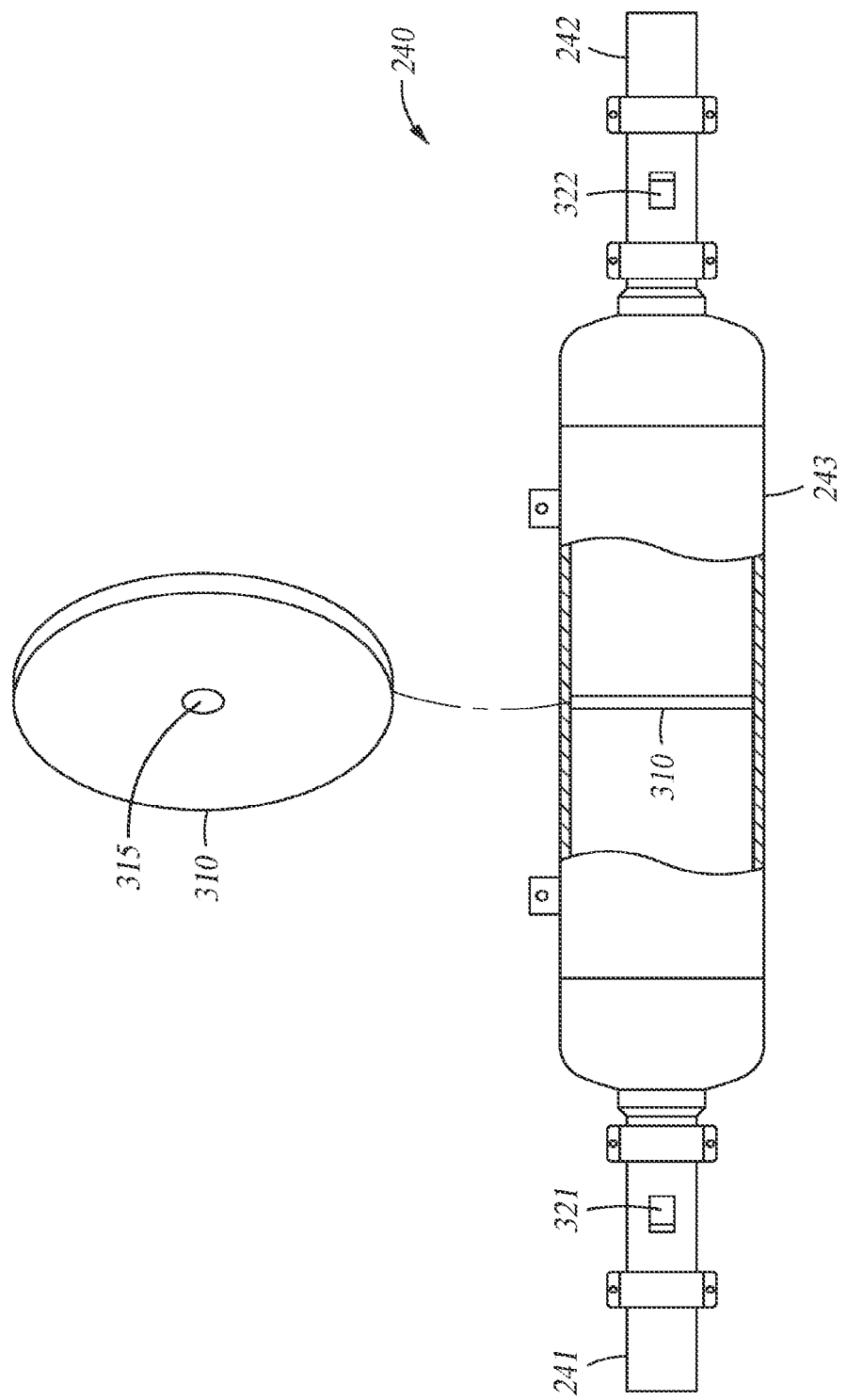
FIG. 3 illustrates a baffle in a shared-reservoir seismic source in accordance with embodiments of the disclosure.

FIG. 3 illustrates a baffle 310 in a shared-reservoir seismic source 240 in accordance with embodiments of the disclosure. The baffle 310 can be made of any material suitable for separating the reservoir 243 into two sub-chambers. For example, the baffle may be metallic and welded into place in the reservoir 243.

As mentioned above, if one of the firing heads 241, 242 fires before the other, most of the compressed air may be directed out of the first head that fires, leaving less (or little) compressed air for the other head. The baffle 310 equally distributes the compressed air between the firing heads 241, 242 when it is attached (e.g., welded) into the middle of the reservoir 243. However, it may be desired to provide one firing head 241, 242 with more compressed air than the other, in which case the baffle 310 may be attached somewhere besides the middle of the reservoir 243.

In FIG. 3, the baffle 310 includes a port 315 (e.g., a pressure regulation feature) that forms an aperture that fluidly connects the two sub-chambers of the reservoir 243. As described below, compressed aft can be pumped into the reservoir 243 using two inlet ports (e.g., which may be located on the same ends of the reservoir 243 as the firing heads 241, 242). The port 315 ensures that the pressure in the two sub-chambers remains the same even when the compressed air received at the two inlet ports differ. In another embodiment, the reservoir 243 may receive compressed air used from only one inlet port which may be connected to one the sub-chambers. The port 315 enables the compressed air received at the sub-chamber coupled to the inlet port to move to the other sub-chamber so that the pressure in the sub-chambers is equal. The size of the aperture formed by the port 315 may be larger if the reservoir 243 has only one inlet port instead of two inlet ports for receiving compressed port (e.g., one inlet port fluidly connected to each one of the sub-chambers). In one embodiment, the diameter of the aperture may range from $\frac{1}{32}$ of an inch to three inches.

In another embodiment, the port 315 includes a valve for selectively coupling the sub-chambers in the reservoir 243. In one embodiment, the valve is a passive check valve that is not actively controlled. Alternatively, the valve may be actively controlled by a controller. For example, when re-filling the reservoir 243, the controller for the seismic source 240 may open the valve to fluidly connect the two sub-chambers, thereby equalizing their pressure. However, before (or when) firing the firing heads 241, 242, the controller can close the valve so that the sub-chambers are no longer fluidly connected. Thus, if one firing head 241, 242 fires before the other, it cannot use air from the other sub-chamber (i.e., the sub-chamber corresponding to the other firing head). Alternatively, the valve in the baffle 310 can be used to select different modes of operation—e.g., a first mode where the valve remains open so that the sub-chambers have the same pressure and a second mode of operation where the valve remains closed so the sub-chambers can have different pressures.

In FIG. 3, the sub-chamber to the left of the baffle 310 corresponds to the firing head 241 while the sub-chamber to the right of the baffle 310 corresponds to the firing head 242. That is, the left sub-chamber stores compressed air that is intended primarily to be used by the firing head 241 to generate an air bubble while the right sub-chamber stores compressed air primarily intended to be used by the firing head 242. The baffle 310 helps to maintain this separation while the port 315 ensures the pressures in the two sub-chambers are close to equal.

While FIG. 3 illustrates a single baffle 310, the reservoir 243 may include two or more baffles 310 that can divide the volume of the reservoir 243 into equally sized sub-chambers or differently sized sub-chambers. These baffles 310 can include pressure regulation features so that the pressures in the sub-chambers can be equalized.

FIG. 3 also illustrates an outlet port 321 for the firing head 241 and an outlet port 322 for the firing head 242. The outlet ports 321, 322 provide an exit for the compressed air when the firing heads 241, 242 are fired. While only one output port 321, 322 is shown per firing heads 241, 242, the firing heads 241, 242 may include multiple ports. For example, each may include another outlet port opposite to the outlet ports 321, 322 as well as output ports on the top and bottom of the firing heads 241, 242 (relative to the up/down directions in FIG. 3).

In one embodiment, the distance between the outlet ports 321 and 322 is at least one meter. In one embodiment, the distance between the ports 321, 322 is at least two meters. In another embodiment, the distance between the ports 321, 322 is at least three meters. In one embodiment, the length of the reservoir 243 is set so that air bubbles generated by the firing heads 241, 242 coalesce. For example, the length of the reservoir 243 (and the lengths of the firing heads 241, 242) may be set so that the distance between the outlet ports 321, 322 is less than three meters. However, the length of the reservoir 243 is not the only factor that determines whether the air bubbles coalesce. For example, the size of the bubbles can affect whether the air bubble coalesce, which can be affected by, e.g., the volume of the reservoir 243, the amount the air in the reservoir 243 is compressed, the type of the firing heads 241, 242, as well as the depth at which the source 240 is operated. AH these factors can be considered when designing the seismic source 240 to ensure that air bubbles generated by firing heads 241, 242 will coalesce, interact without coalescing, or not interact at all.

Figure 4:
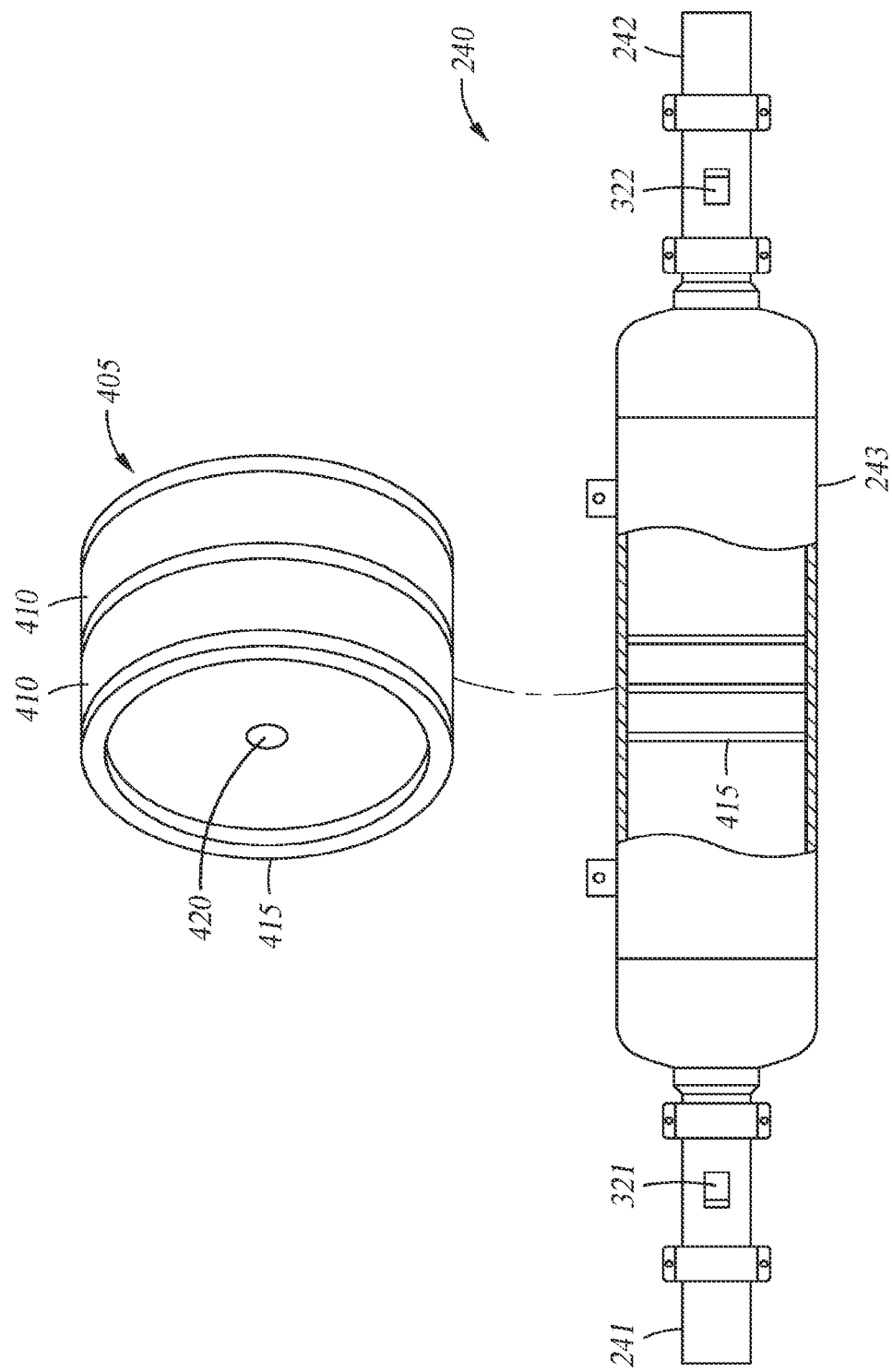
FIG. 4 illustrates a volume reducer in a shared-reservoir seismic source in accordance with embodiments of the disclosure.

FIG. 4 illustrates a volume reducer 405 in a shared-reservoir seismic source 240 in accordance with embodiments of the disclosure. In one embodiment, the volume reducer 405 is a type of baffle. Like the bathe 310 in FIG. 3, the volume reducer 405 divides the reservoir 243 into two separate sub-chambers. Thus, the volume reducer 405 has the advantages described above where the compressed air in the reservoir 243 can be allocated equally to the firing heads (or in whatever ratio that is desired).

The volume reducer 405 has dimensions for reducing the volume of the reservoir 243 (and the corresponding volumes of the sub-chambers) by a predefined amount. To do so, the volume reducer 405 includes a retention ring 415 that supports spacer material 410. The spacer material 410 can be metal, acetal, polyurethane, brass, peek, etc. In one embodiment, the retention ring 415 is welded to the inner wall of the reservoir 243 once the volume reducer 405 is arranged in the desired location. Attaching the retention ring 415 to the reservoir 243 also holds the spacer material 410 in place.

For some applications, a reduced volume reservoir 243 may be desired. Instead of using a different sized reservoir 243, the same reservoir 243 can be used but with the addition of a volume reducer 405. Thus, rather than having to modify fabrication procedures each time a different size reservoir is required, a manufacturer can use the same (large) reservoir 423 but decrease its volume to suit the particular application by adding the appropriately sized volume reducer 405. This approach may be much more time and cost effective than having to maintain an inventory of different sized reservoirs 423.

Like the baffle 310, the volume reducer 405 (which can be characterized as a type of baffle) includes a port 420 for equalizing the pressure between the sub-chambers. The port 420 can define an aperture that fluidly connects the two sub-chambers, or a valve that selectively couples the two sub-chambers (e.g., coupling the sub-chambers when re-filling the reservoir 423 and disconnecting the chambers when firing the firing heads).

The volume of the reservoir 243 can vary according to the particular implementation. In some embodiments, the volume range of the reservoir 243 can vary from 3000 cubic inches to 15,000 cubic inches. The volume of the reservoir 243 can then be reduced by using the volume reducer 405.

FIG. 5 illustrates a sensor system 500 that includes a shared-reservoir seismic source 240 attached to a control plate 505 in accordance with embodiments of the disclosure. As shown, the control plate 505 is coupled to the seismic source 240 via suspension means 525 (e.g., chains, wires, rope, rods, etc.). Although not shown, the control plate 505 can be attached on its top side to a float or a bottom of a vessel which, in part, sets the depth of sensor system 500 in the body of the water. In turn, the suspension means 525 support the seismic source 240 at the desired depth.

The sensor system 500 also includes cable bundles 521 and 522 that extend between the control plate 505 and respective ones of the firing heads 241, 242. In one embodiment, the cable bundles 521, 522 include at least one air hose and electrical wire. The air hose provides air for refilling the reservoir 243 after the firing heads 241, 242 have created air bubbles. That is, in this embodiment, each cable bundle 521, 522 includes an air hose that extends through one of the firing heads 241, 242 and connects to a respective inlet port of the reservoir 243 disposed on opposite ends of the reservoir 243. In this manner, the reservoir 243 is refilled with compressed air from both of its ends connected to the firing heads 241, 242, Thus, if the reservoir includes a baffle or volume reducer dividing it into two sub-chambers, one sub-chamber can be refilled via the air hose in cable bundle 521 while the other sub-chamber is refilled via the air hose in the cable bundle 522. However, as mentioned above, the reservoir 243 may be refilled via a single air hose and inlet port. In that embodiment, only one of the cable bundles 521, 522 may include an air hose.

In another embodiment, rather than the air hoses being in the cable bundles 521, 522 and having to extend through the firing heads 241, 242, the air hoses may extend directly from control plate 505 to a side of the reservoir 243. For example, the air house may be tied or fastened to the suspension means 525 that provide support for the air hoses as they extend between the control plate 505 and the reservoir 243.

In one embodiment, the electrical wires in the cable bundles 521, 522 transmit control signals from a controller 515 in the control plate 505 to the firing heads 241, 242. In one embodiment, the control signals instruct the firing heads 241, 242 when to fire—e.g., when to generate a seismic force by creating air bubbles. The controller 515 can be a microprocessor, a microcontroller, a programmable logic controller (PLC), and the like. The controller 515 may receive instructions from another computing system that is, for example, on the vessel that is towing the sensor system 500. In general, the controller 515 provides any signals required to operate the seismic source 240. For example, in addition to controlling the firing of the heads 241, 242, the controller 515 may instruct when to provide air for refilling the reservoir 243 (assuming the air hoses are not constantly providing air to the reservoir 243) and control any actuators on the source 240 (e.g., such as a valve in the baffle).

As described in later figures, the control system 500 can be connected to a tow vessel that provides compressed air to the control plate 505 which then routes the compressed air to the reservoir 243 via the cable bundles 521, 522. To route hoses and wires from one side of the control plate 505 to the other, the control plate 505 includes an annular portion 530 where air hose(s) and electrical wire(s) can be routed from the left side of the control plate 505 to its right side.

The control plate 505 also includes a hydrophone 510 which is one example of the seismic receivers 110 illustrated in FIG. 1. The hydrophone 510 can detect reflections from the seismic energy generated by the air bubbles of the firing heads 241, 242 to detect subsurface structures. Thus, the hydrophones 510 can be part of the same sensor system 500 as the seismic source 240 instead of having to be part of a different towed system. Put differently, the seismic receivers 110 can be part of the same towed structure (e.g., the sensor system 500) as the seismic source 240. While FIG. 5 illustrates only one hydrophone 510, the system 500 can include any number of hydrophones 510.

Firing the heads 241, 242 may cause the seismic source 240 to rapidly move vertically in a direction towards the control plate 505. This might cause the control plate 505 and the seismic source 240 to collide which may damage one or both of these components. To prevent this collision, the suspension means 525 may be rigid or may include a rigid covering. For example, if the suspension means 525 are chains, the chains could be enclosed in a rigid (or semi-rigid) rubber hose that extends between the control plate 505 and the source 240 to maintain a minimum spacing between these components. Thus, if the source 240 jumps towards the control plate 505, the rubber hose can maintain the spacing between the two components.

Figure 6A:
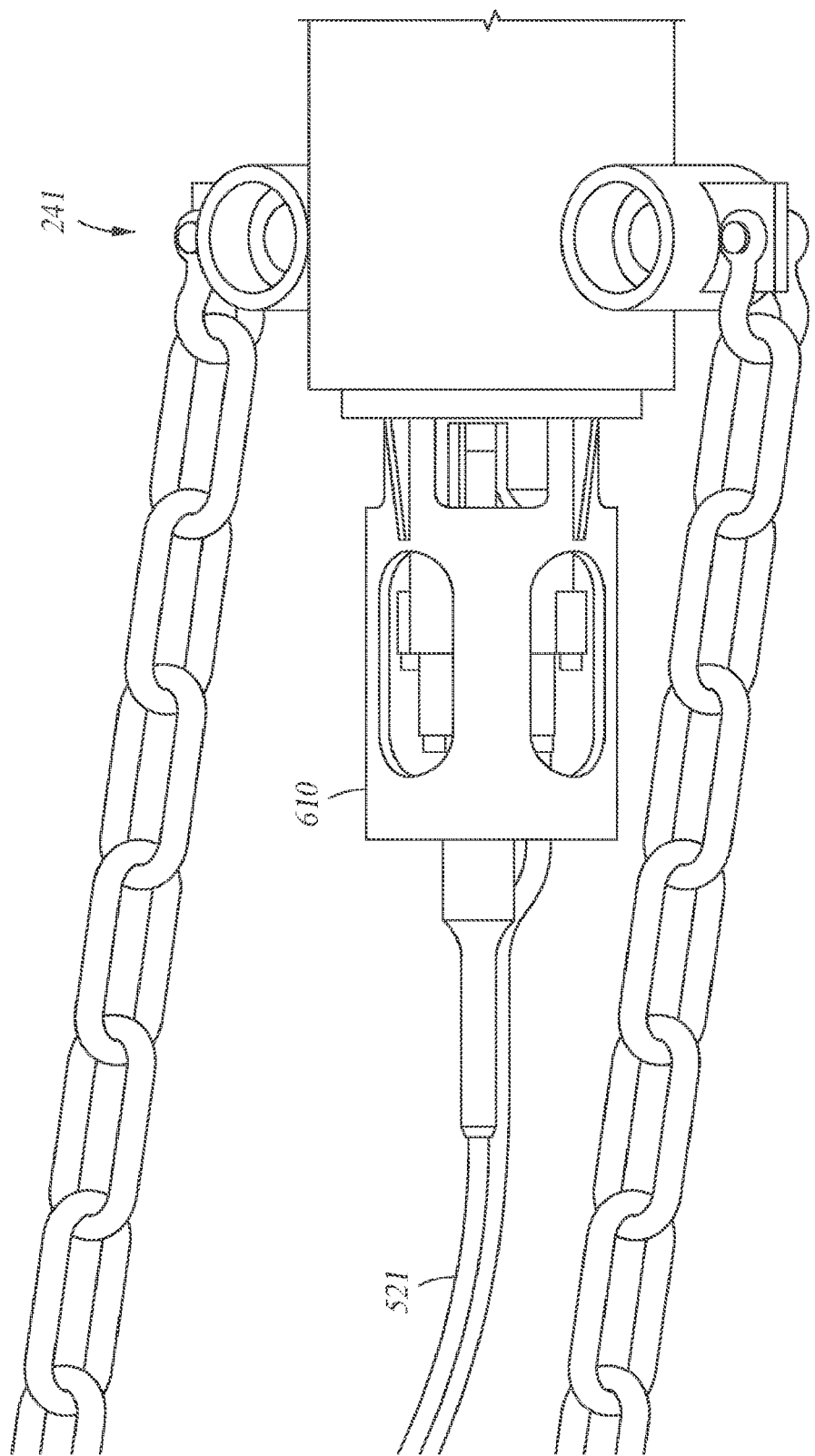
FIGS. 6A and 6B illustrate covering cable connections to a firing head in accordance with embodiments of the disclosure.
Figure 6B:
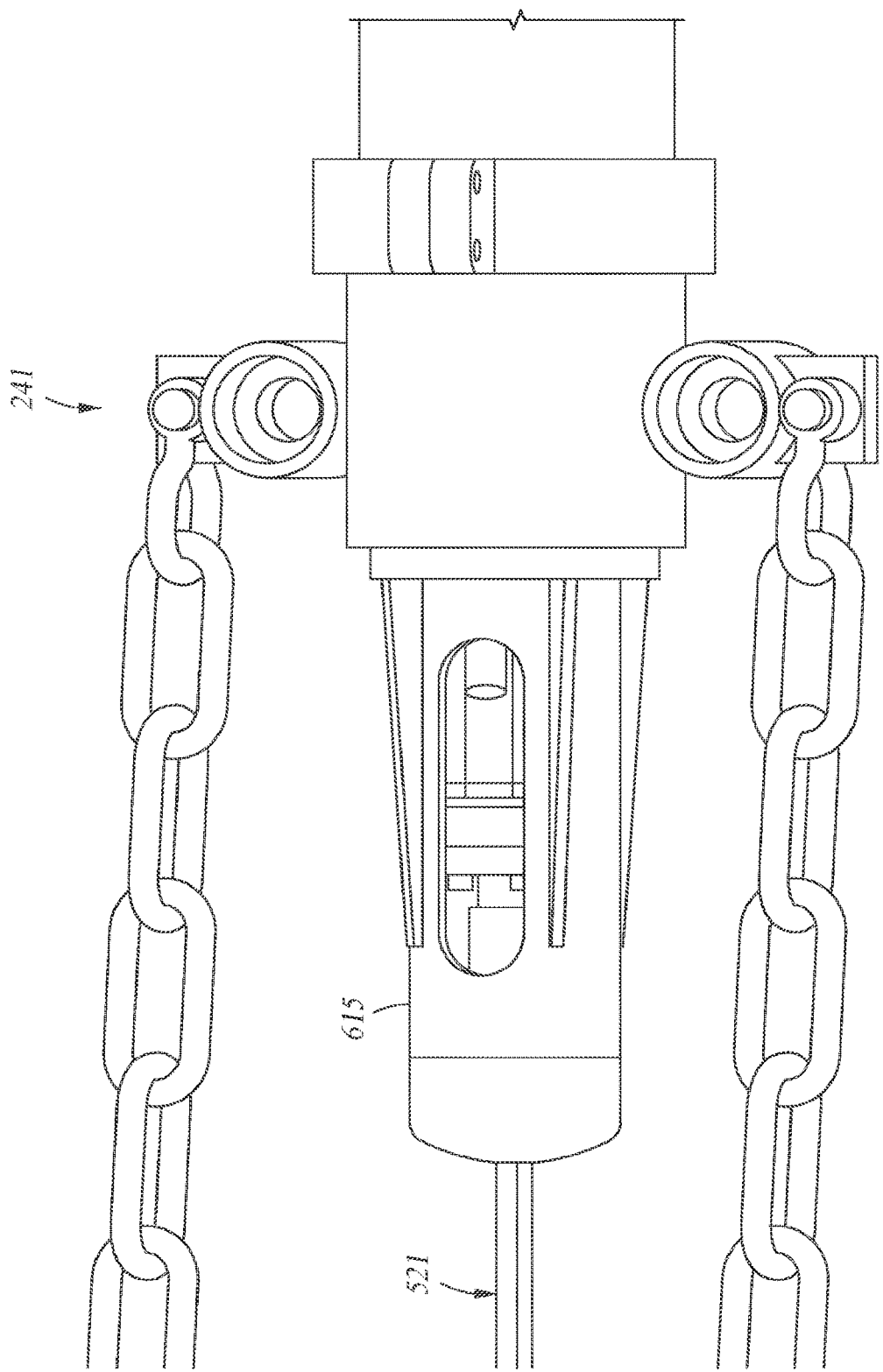

FIGS. 6A and 6B illustrate covering cable connections 605 to a firing head 241 in accordance with embodiments of the disclosure. FIG. 6A provides a closer view of cable connections 605 that connect the cable bundle 521 to the firing head 241. In this example, the firing head 241 includes a shroud 610 surrounding the point where the cable connections 605 mate with the firing head 241. In one embodiment, the cable connections 605 include both connectors for an air hose and electrical connections, but in other embodiments, may include only electrical connections.

As shown, the cable connections 605 protrude beyond the shroud 610. As a result, the shroud 610 may not provide adequate protection for the air and electrical lines in the connections 605. For example, due to forces on the cable bundle 521 or the firing head 241, the cable connections 605 may disconnect from the firing head 421. Alternatively, the cable connections 605 may have too much freedom of movement and rub against the shroud 610 which can damage the cable connections 605.

FIG. 6B illustrates a cover 615 that covers the shroud 610 and the cable connections 605 illustrated in FIG. 6A. For example, the cover 615 may attach to the firing head 241 on a first end so it is held rigidly in place. At a second, opposite end, the cable bundle 521 is routed through the cover 615 in order to connect to the firing head 241 as shown in FIG. 6A. The second end of the cable bundle 521 can limit the movement of the cable bundle 521 which reduces the likelihood that the cable connections 605 will disconnect from the firing head 241 or that the cable connections 605 rub against the shroud 610.

Figure 7:
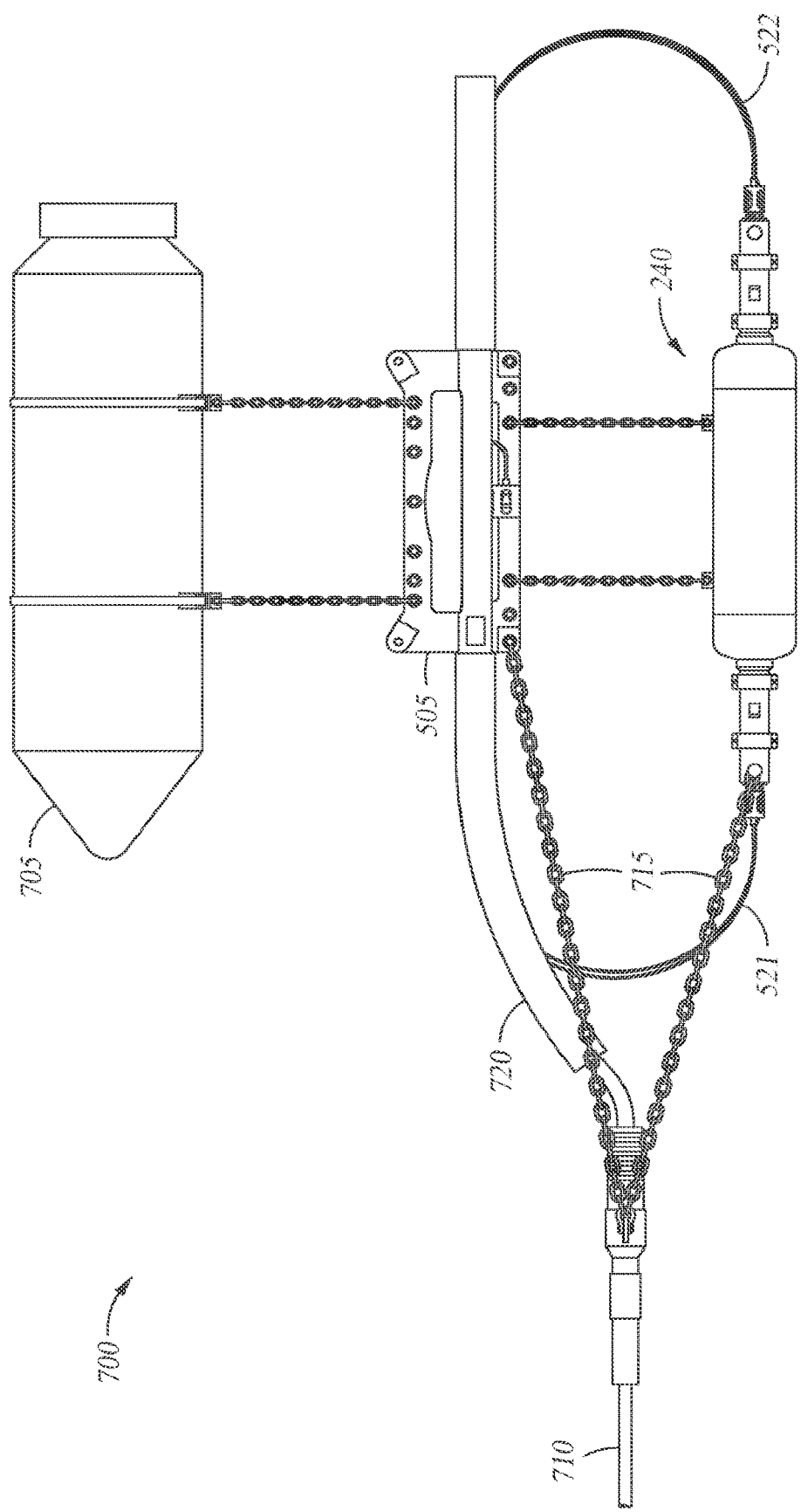
FIG. 7 illustrates a sensor system that is towed behind a vessel in accordance with embodiments of the disclosure.

FIG. 7 illustrates a sensor system that is towed behind a vessel in accordance with embodiments of the disclosure. FIG. 7 illustrates a similar sensor system 700 as the sensor system 500 in FIG. 5A but with the addition of several new components, namely, a float 705, an umbilical cord 710, a tow bridle 715, and a covering 720. The system 700 also includes the cable bundles 521, 522, the seismic source 240, and the control plate 505, which were described above.

The float 705 is attached to the control plate 505 to set a depth of the sensor system 700. That is, the float 705 may be designed to have a buoyancy to maintain the sensor system 700 at a certain depth. However, the depth can be controlled by other means as well, such as a depressor, ballast (weight) system, a downforce foil, and a steering foil. The sensor system 700 is not limited to any particular type of float 705 or other depth control mechanism (or combination of depth control mechanisms).

The umbilical cord 710 connects the sensor system 700 to a tow vessel. In one embodiment, the umbilical cord 710 includes a high pressure air hose that is coupled to a pressure source (e.g., a compressor) on the tow vessel. The high pressure air hose extends through the umbilical cord 710, and in this embodiment, connects to the control plate 505. The control plate 505 then routes the compressed air to the seismic source 240 using the cable bundles 521 and 522 as discussed above. In addition to providing compressed air, the umbilical cord 710 can include electrical wires so that the controller on the control plate 505 is communicatively coupled to a computing system on the tow vessel. As a result, an operator can receive status updates from the sensor system 700, receive sensor data, and provide updated commands, if desired.

To move the sensor system 700, the umbilical cord 710 is coupled to a tow bridle 715 that is in turn coupled to the control plate 505 and the seismic source 240. In this example, the tow bridle 715 includes a first connector connecting the umbilical cord 710 to the control plate 505 and a second connector connecting the umbilical cord 710 to the seismic source 240. Although chains are shown, these connectors could be ropes or a rod.

While the umbilical cord can be connected directly to the control plate 505 (and the tow bridle 715 could be omitted), doing so may result in the seismic source 240 rocking in the horizontal direction in FIG. 7 (to the right and left) when being towed. This rocking may damage the air hose and electrical wires in the cable bundles 521, 522. The tow bridle 715 mitigates the rocking since the bridle 715 is coupled to both the control plate 505 and the seismic source 240.

When towing the sensor system 700 (e.g., when the sensor system is pulled to the left by the umbilical cord 710), the cable bundle 521 may be pushed or bent to the right. That is, while FIG. 7 illustrates the cable bundle 521 forming a C shape, when being towed the middle of the cable bundle 521 may be pushed to the right. Deforming the cable bundle 521 in this manner adds stress to the connection points where the bundle 521 connects to the control plate 505 and the seismic source 240, which can cause additional wear and tear or cause the cable bundle 521 to be disconnected. To prevent (or mitigate) the cable bundle 521 from deforming, a portion of the cable bundle 521 is encased by a rigid or semi-rigid covering 720. As shown, the covering 720 at least extends from the point where the cable bundle 521 attaches to the control plate 505 to the location where the cable bundle 521 begins to curve down towards the seismic source 240. In FIG. 7, the covering 720 extends beyond the point where the cable bundle 521 begins to curve towards the seismic source 240 to protect pneumatic and electrical lines. For example, the covering 720 may include a slit or aperture for the cable bundle 521 to exit the covering 720 so the bundle 521 can connect to the source 240. The material of the covering 720 is more rigid than the air hose and electrical wires forming the cable bundle 521, and thus, minimizes the deformation of the bundle 521 when being towed. In one embodiment, the covering 720 is connected to the towing bridle 715 to hold the covering 720 in place and provide further support to the cable bundle 521 extending through the covering 720.

Although not required, another covering like the covering 720 can be used to enclose the portion of the cable bundle 522 that connects to the right side of the control plate 505. Although the cable bundle 522 will likely not deform like the cable bundle 521 when being towed, the addition covering can provide support to this connection and mitigate rubbing between the cable bundle 522 and the control plate 505 and the seismic source 240.

Further, additional coverings can be used for the portions of the cable bundles 521, 522 that attach to the firing heads of the seismic source 240. These coverings can extend from the point where the bundles 521, 522 connect to the seismic source 240 to the locations where the cable bundles 521, 522 begin to curve towards the control plate 505. Any combination of the coverings discussed above can keep portions of the cable bundles 521, 522 straight and help maintain the air hose and electrical connections while the remaining portions of the cable bundles 521, 522 can be uncovered so the cable bundles 521, 522 can curve as shown in FIG. 7.

Figure 8:
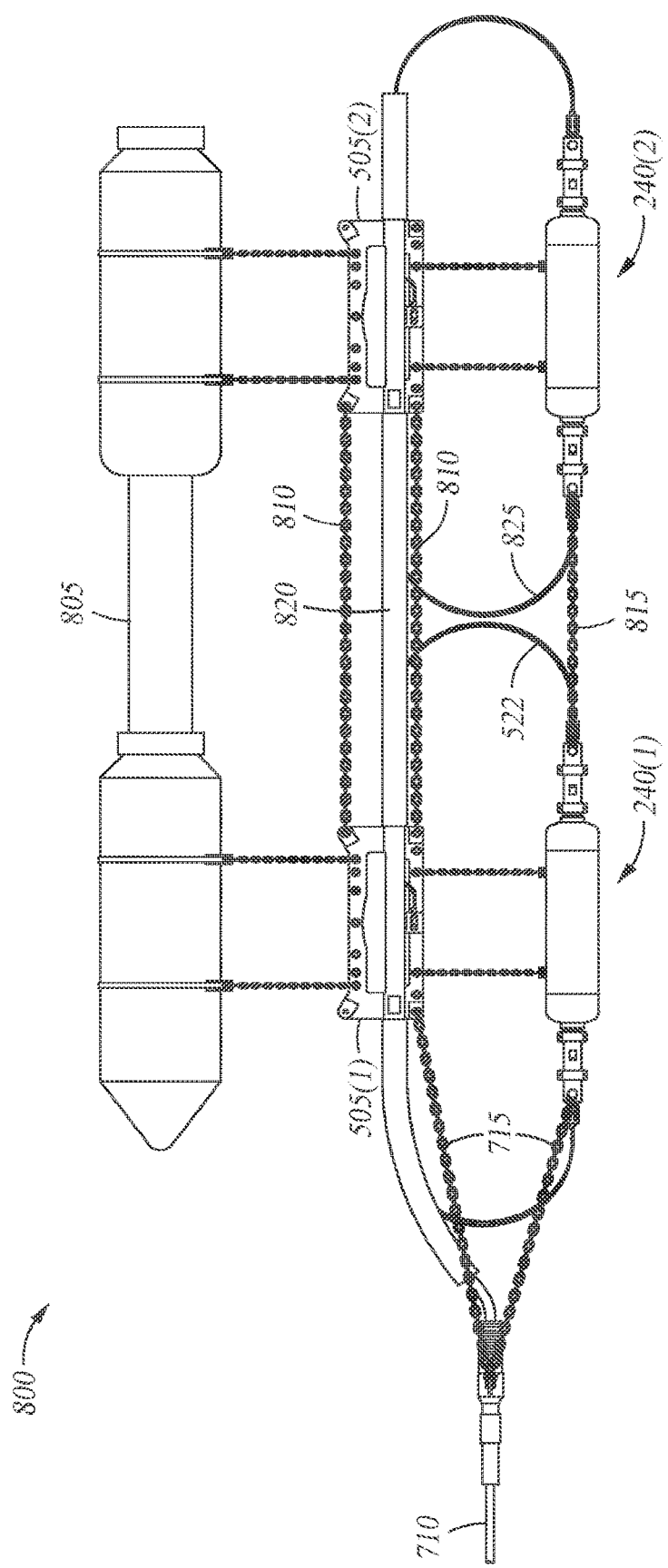
FIG. 8 illustrates a sensor system that is towed behind a vessel in accordance with embodiments of the disclosure.

FIG. 8 illustrates a sensor system 800 that is towed behind a vessel in accordance with embodiments of the disclosure. The sensor system 800 includes two control plates 505(1), 505(2) and two seismic sources 240(1), 240(2) that are suspended by a shared float 805, As shown, the control plates 505(1), 505(2) are coupled to the same float 805. In this case, the seismic sources 240(1), 240(2) are arranged linearly (i.e., in-line) with respect to each other. The high pressure hose and electrical connections in the umbilical cord 710 are first routed to the control plate 505(1) before being routed to the control plate 505(2). For example, the high pressure hose and electrical connections may be routed through, and encased in, a supply line 820 that extends between the control plate 505(1) and the control plate 505(2). This supply line 820 can be a rigid material to help maintain a spacing between the control plates 505(1), 505(2) and the seismic sources 240(1), 240(2). In addition to providing a conduit for the high pressure hose and the electrical wires received from the umbilical cord 710, the supply line 820 can serve as a partial covering for the cable bundle 522 and a cable bundle 825 coupled to the control plate 505(2) and the seismic source 240(2).

The sensor system 800 includes tow connections 810 that connect the control plate 505(1) to the control plate 505(2) and a tow connection 815 that connects the seismic source 240(1) to the seismic source 240(2). The tow connections 810, 815 can apply a force to pull the control plate 505(2) and the seismic source 240(2) behind the control plate 505(1) and the seismic source 240(1). However, these tow connections 810, 815 are not necessary. Instead, the sensor system 800 could rely solely on the connection between the control plate 505(2) and the float 805 to the tow seismic source 240(2). Alternatively, the sensor system 800 may include the tow connections 810 but not the tow connection 815, or include the tow connection 815 but not the tow connections 810.

Having multiple seismic sources 240(1), 240(2) in the same sensory system 800 provides several advantages. First, if there is a mechanical or electrical problem with one of the seismic sources 240, the other source can be used, thereby providing redundancy. For example, one of the seismic sources 240 can be used as a spare. Second, the rate at which the bubbles are generated can be increased relative to using one seismic source. While the reservoir in the seismic source 240(1) is being refilled, the seismic source 240(2) can be fired, and vice versa. Assuming the pressure source can supply sufficient compressed air, the seismic sources 240 can be refilled in parallel (e.g., at the same time). The controllers can stagger when they fire the seismic sources 240. Being able to generate the air bubbles at a faster rate means the vessel can sail faster, thereby reducing the amount of time needed to survey the same area.

The seismic source 240(1) and the shared reservoir seismic source 240(2) may include individual control components to allow the forward source 240(1) and aft source 240(2) to be independently fired. That is, the source 240(1) and the source 240(2) may be fired simultaneously, sequentially or staggered (with a controlled delay between each firing), asynchronously, or any combination thereof. The control components and/or control circuitry may be configured to determine firing timing based on signals received via wired or wireless communication circuitry (e.g., from a towing or other vessel, control components of the other firing head, from another shared chamber seismic source array, etc., or combinations thereof), based on internal timing circuitry and programmed timing configurations or parameters, or any combination thereof.

Figure 9:
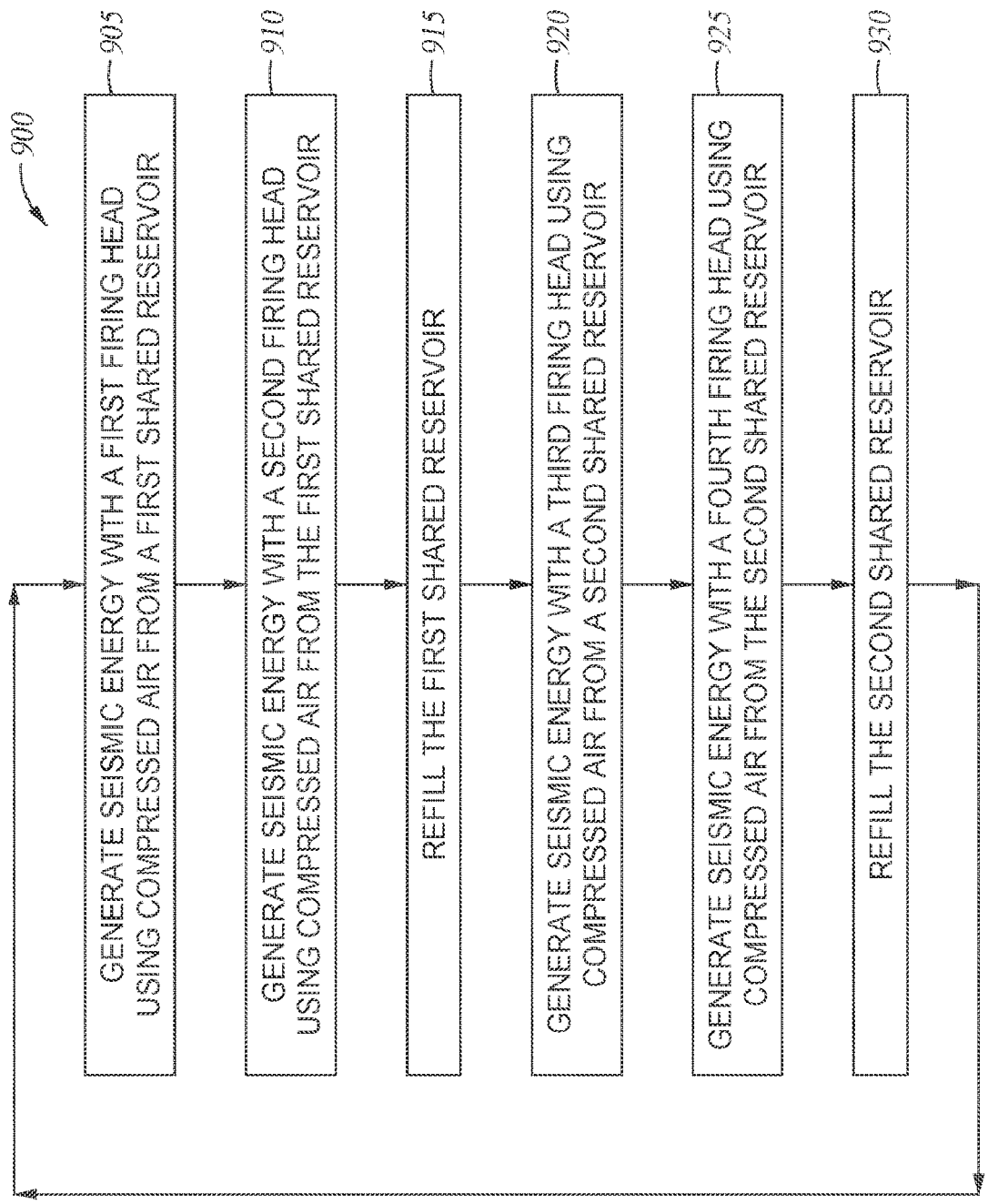
FIG. 9 is a flowchart for generating seismic energy using multiple shared-reservoir seismic sources in accordance with embodiments of the disclosure.
Figure 10:
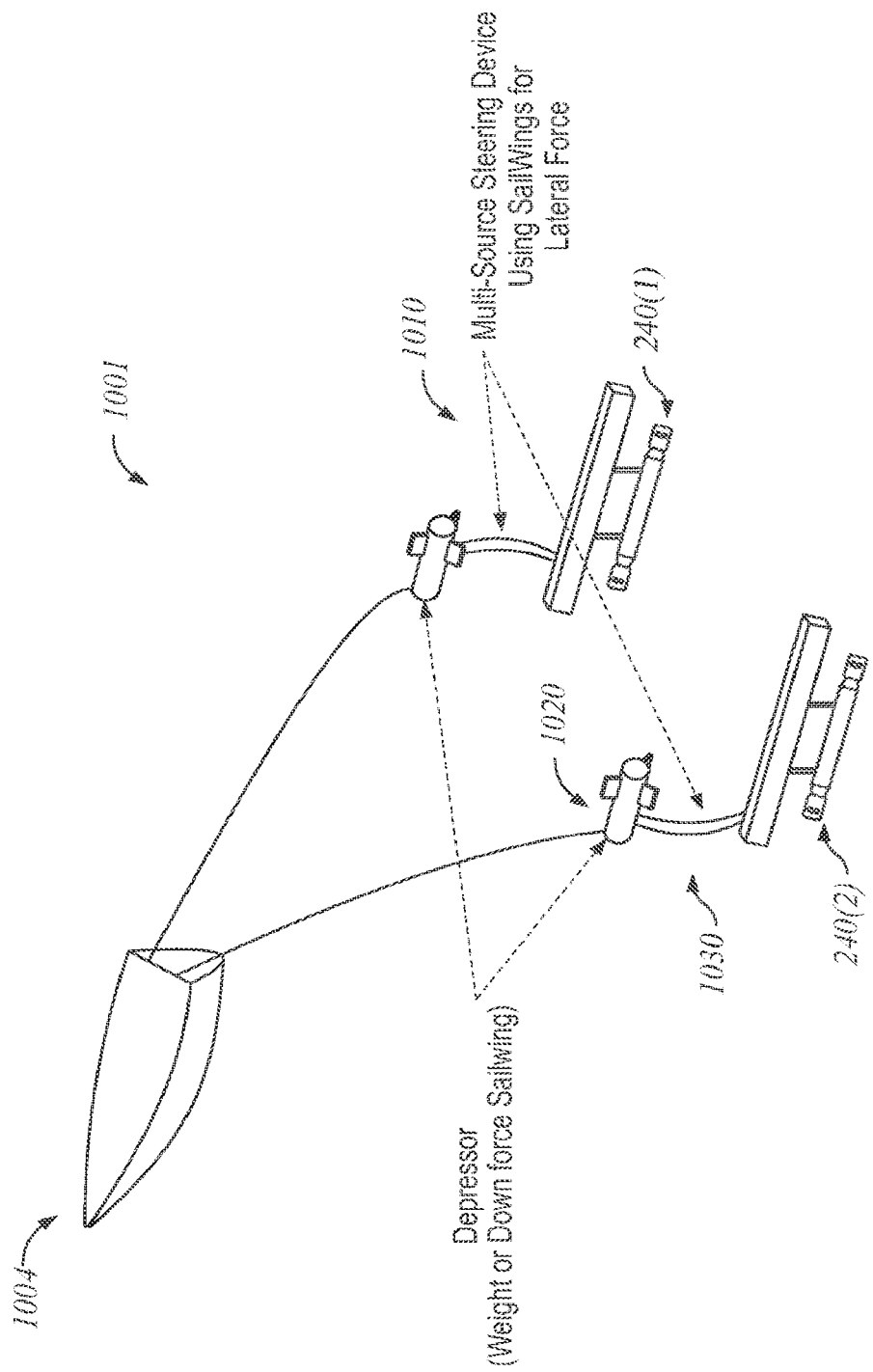
FIG. 10 is a schematic illustration of a representative towing configuration 1001 for shared chamber seismic source arrays in accordance with embodiments of the disclosure.

FIG. 9 is a flowchart of a method 900 for generating seismic energy using multiple shared-reservoir seismic sources in accordance with embodiments of the disclosure. In one embodiment, the method 900 is performed using a sensor system that has at least two seismic sources. The seismic sources may be arranged in-line as shown in FIG. 8 or may be part of two separate sensor systems which are towed using separate umbilical cords by the same tow vessel or two different vessels. For example, the two seismic sources may be towed side-by-side at approximately the same depth (as shown in FIG. 10 below) using two separate umbilical cords. Regardless of the positioning of the seismic sources relative to each other, the method 900 provides techniques for synchronizing the two seismic sources.

At block 905, a first firing head generates seismic energy using compressed air from a first shared reservoir of a first seismic source. In one embodiment, the seismic energy results from an air bubble generated by the first firing head when releasing the compressed air. In one embodiment, the first firing head is attached to a first end of the first shared reservoir as illustrated in FIG. 2 while a second firing head is attached to a second, opposing end of the first shared reservoir. However, in another embodiment, the first and second firing heads may be attached to a same side of the shared reservoir or at the middle of the shared reservoir. The first and second firing heads may be connected to the same chamber in the reservoir or respective sub-chambers.

At block 910, the second firing head generates seismic energy using compressed air from the first shared reservoir. In one example, the first shared reservoir may be separated into two sub-chambers by a baffle so that a first sub-chamber corresponds to the first firing head while a second sub-chamber corresponds to the second firing head. If the first and second firing heads generate bubbles that are intended to be the same size, the sub-chambers may be equal in volume and the baffle may include a pressure regulation feature (e.g., a port) to maintain substantially equal pressures (e.g., with an difference of less than 5%) in the two sub-chambers.

In one embodiment, blocks 905 and 910 may be performed at the same time or substantially the same time to generate respective air bubbles that interact or coalesce. Separate control signals can be used in case one of the first and second firing heads has a delayed response relative to the other so that the heads can be synchronized to generate air bubbles at the same time. That is, the method 900 may be tuned such that control signals are sent at the same time or delayed so that the first and second firing heads generate air bubbles at the same time. However, in another embodiment, the blocks 905 and 910 are performed at separate times so the respective air bubbles do not interact.

At block 915, the first shared reservoir is refilled. In one embodiment, the reservoir may constantly be refilled, while in other embodiments, a controller may stop the compressed air from flowing to the reservoir when the first and second heads are fired. In another embodiment, the compressed air supply may be able to refill the reservoir faster than the first and second heads are fired. Thus, there may be gaps of time between when the reservoir has been refilled and the first and second heads are again fired. However, in another embodiment, the controller may fire the first and second heads once the reservoir has been refilled (i.e., reached a desired pressure, such as 2000 PSI).

At block 920, a third firing head generates seismic energy using compressed air from a second shared reservoir of a second seismic source. The second seismic source also includes a fourth firing head fluidly coupled to the second shared reservoir. The third and fourth firing heads can be coupled to the second shared reservoir in any arrangement discussed above.

At block 925, the fourth firing head generates seismic energy using compressed air from the second shared reservoir. The third and fourth firing heads may be synchronized to generate air bubble that coalesce, that interact but do not coalesce, and that do not interact, as described above.

Further, generating seismic energy using the first and second heads on the first seismic source may be synchronized with generating seismic energy using the third and fourth heads on the second seismic source. In one embodiment, the first and second seismic sources may be fired at a set rate (e.g., first the first and second firing heads are fired at the same time, followed by a set delay, followed by the third and fourth firing heads being fired at the same time, followed by the set delay, followed by the first and second firing heads being fired, followed by the set delay, and so forth). In another embodiment, the first, second, third, and fourth firing heads may be fired at the same time.

At block 930, the second shared reservoir is refilled with compressed air. This refilling can be performed in a same manner as described at block 915 above.

FIGS. 10-13 are schematic illustrations of a representative towing configurations 1001, 1101, 1201, and 1301, respectively, illustrating representative examples of a shared-reservoir seismic source array, according to the various embodiments described herein.

FIG. 10 is a schematic illustration of a representative towing configuration 1001 for shared chamber seismic source arrays 240(1), 240(2) in accordance with embodiments of the disclosure. In some examples, the shared-reservoir seismic source arrays 125 of FIG. 1 may implement the shared-reservoir seismic source arrays 240(1), 240(2). Each of the shared-reservoir seismic source arrays 240(1), 240(2) may include a shared chamber and at least two firing heads.

FIG. 10, the shared-reservoir seismic source arrays 240(1), 240(2) may be are deployed in one or more source subarrays 1010, e.g., deployed using a depressor, ballast (weight) system or downforce foil 1020 and one or more steering foils 1030, e.g., using one or more "SailWing" type or other steerable foil devices as described in U.S. Pat. No. 9,632,195, International patent application PCT/US2016/057344 (WO 2017/066762), U.S. patent application Ser. No. 14/959,009 (Publication No. 2016/0161622), and International patent application PCT/IB2017/000209 (WO 2017/141111), each of which is incorporated by reference herein, in the entirety and for all purposes. The towing configuration 1001 is shown in FIG. 10 as being towed by a vessel 1004.

In some examples, the shared-reservoir seismic source arrays 240(1), 240(2) may be controlled to achieve specific firing sequences. For example, the firing heads of each the shared chamber seismic source arrays 240(1), 240(2) may be fired simultaneously, sequentially or staggered (with a controlled delay between each firing), asynchronously, or any combination thereof. The selected firing sequence for the shared-reservoir seismic source arrays 240(1), 240(2) may be based on a target survey activity.

In an example, the firing heads of each of the shared-reservoir seismic source arrays 240(1), 240(2) may be fired simultaneously a periodic interval. In another example, the firing heads of the shared-reservoir seismic source array 240(1) may be fired simultaneously at a first time and the firing heads of the shared-reservoir seismic source array 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads of the shared-reservoir seismic source arrays 240(1), 240(2).

In another example, a respective first firing head of each of the shared-reservoir seismic source arrays 240(1), 240(2) may be fired simultaneously at a first time and a respective second firing head of each of the shared-reservoir seismic source arrays 240(1), 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads.

In another example, a respective first firing head of each of the shared-reservoir seismic source arrays 240(1), 240(2) may be fired simultaneously at a first time and a respective second firing head of each of the shared-reservoir seismic source arrays 240(1), 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads.

In another example, a respective first firing head of each of the shared-reservoir seismic source arrays 240(1), 240(2) may be fired sequentially with a first delay in between starting at a first time and a respective second firing head of each of the shared-reservoir seismic source arrays 240(1), 240(2) may be fired sequentially with the first delay in between starting at a second time following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(1), 240(2).

In another example, the firing heads of the shared-reservoir seismic source array 240(1) may be fired sequentially with a first delay in between starting at a first time and the firing heads of the shared-reservoir seismic source array 240(2) may be fired sequentially with the first delay in between starting at a second time following the first time by a second delay The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(1), 240(2).

In another example, the firing heads of the shared-reservoir seismic source arrays 240(1), 240(2) may all be fired sequentially with a first delay in between each discharge. The delay may be between and including 0.5 and 5 seconds, in some examples. In some examples, the delay may be 0.5, 1, 2 or 5 seconds. The delay may be selected to cause a desired effect between air bubbles generated by the respective firing heads. The delay may be based on recovery time associated with the shared reservoir of each of the shared-reservoir seismic source arrays 240(1), 240(2).

Figure 11:
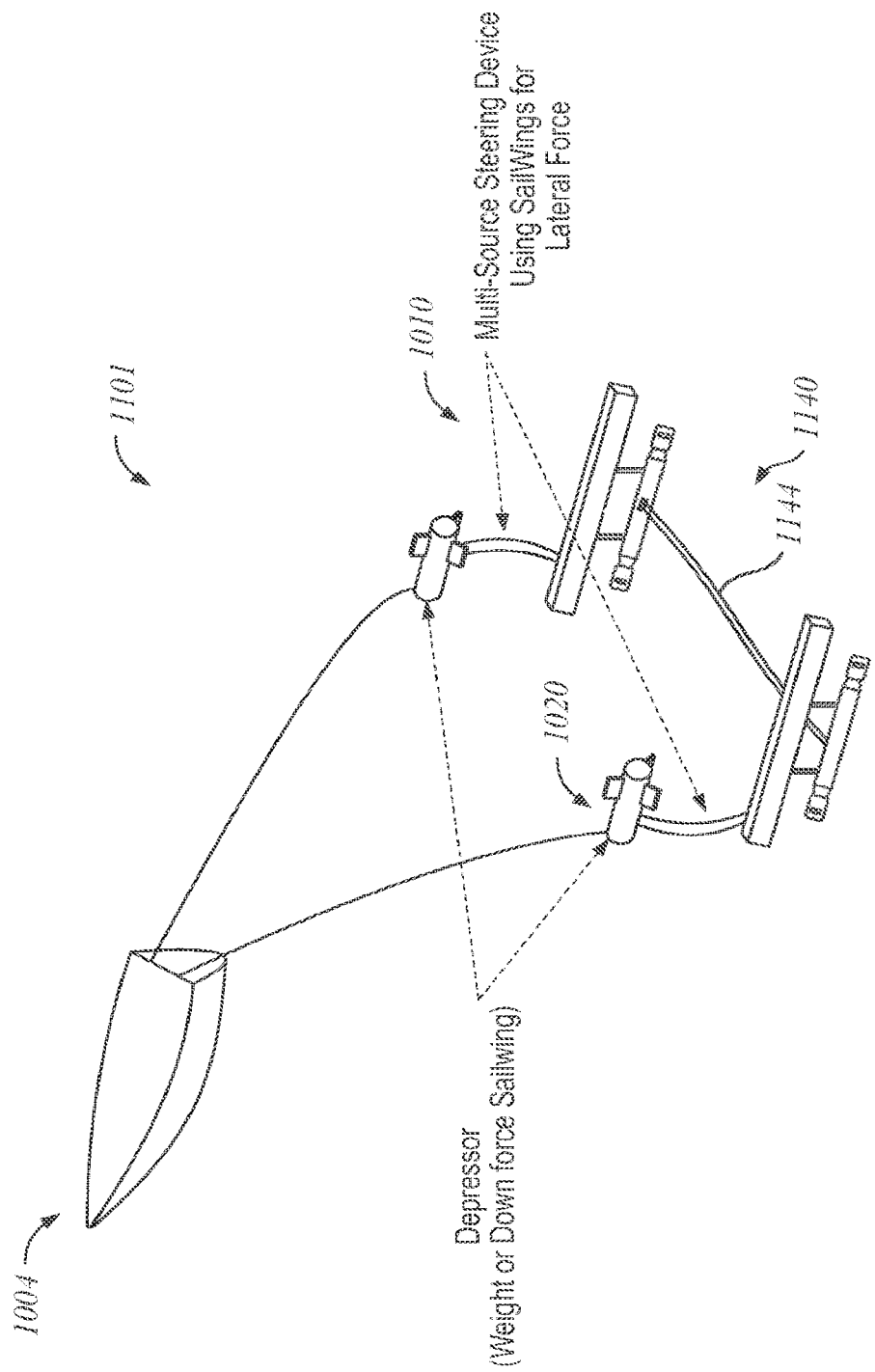
FIG. 11 is a schematic illustration of a representative towing configuration for a shared chamber seismic source array system in accordance with embodiments of the disclosure.

FIG. 11 is a schematic illustration of a representative towing configuration 1101 for a shared chamber seismic source array system 1140 in accordance with embodiments of the disclosure. The towing configuration 1101 may include elements that have been previously described with respect to the towing configuration 1001 of FIG. 10. Those elements have been identified in FIG. 11 using the same reference numbers used in FIG. 10 and operation of the common elements is as previously described. In the interest of brevity, a detailed description of the structure and function of these elements need not be repeated.

Figure 14:
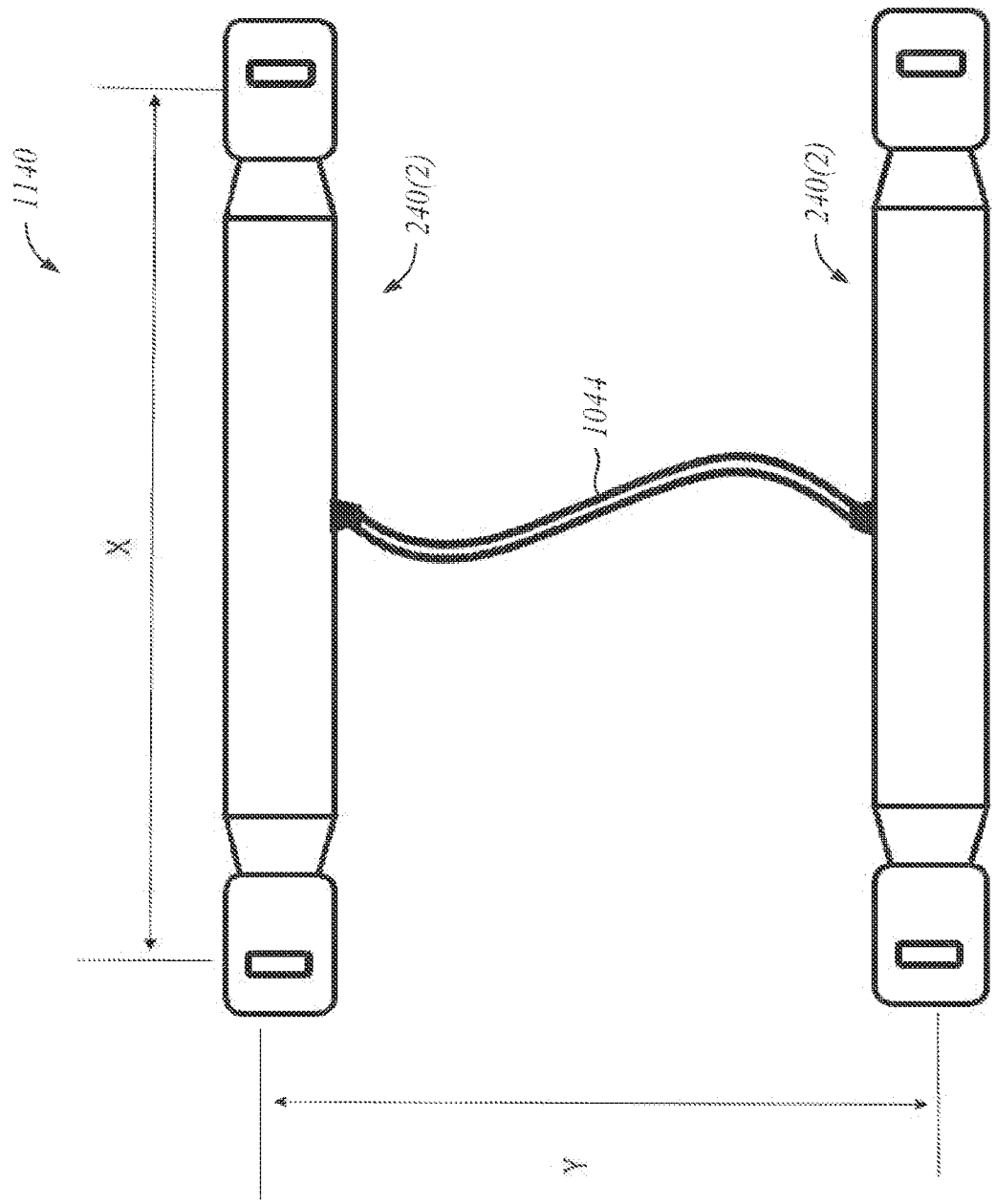
FIG. 14 includes a perspective view of a shared-reservoir seismic source array system in accordance with embodiments of the disclosure.

In some examples, the shared-reservoir seismic source arrays 125 of FIG. 1 may implement the shared-reservoir seismic source array system 1140. The shared-reservoir seismic source array system 1140 may include at least two shared-reservoir seismic source arrays. FIG. 14 includes a perspective view of a shared-reservoir seismic source array system 1140 in accordance with embodiments of the disclosure. In an example, the shared-reservoir seismic source array system 1140 may implement the shared-reservoir seismic source array system 1140 of FIG. 14.

As shown in FIG. 14, the shared-reservoir seismic source array system 1140 includes two shared-reservoir seismic source arrays 240(1), 240(2) coupled together via a pressure line 244. In an example, each of the shared-reservoir seismic source arrays 240(1), 240(2) of FIG. 14 may implement a respective one of the shared-reservoir seismic source array 240 of FIG. 2. The pressure line 244 may serve to equalize pressure between the respective shared chambers of the shared-reservoir seismic source arrays 240(1), 240(2). Each end of the pressure line 244 may connect to the shared reservoir of a respective one of the shared-reservoir seismic source arrays 240(1), 240(2) at a port.

The seismic energy (e.g., including a frequency spectrum) generated by the shared chamber seismic source array system 1140 may be based on the separation distance between the firing heads of the shared-reservoir seismic source arrays 240(1), 240(2), the relative compressed air discharge timing from each firing head, and compressed air discharge volume provided from each of the firing heads of the shared-reservoir seismic source arrays 240(1), 240(2).

In some examples, the shared-reservoir seismic source array system 1140 may be controlled to achieve specific firing sequences. For example, the firing heads of each the shared chamber seismic source arrays 240(1), 240(2) may be fired simultaneously, sequentially or staggered (with a controlled delay between each firing), asynchronously, or any combination thereof. The selected firing sequence for the shared-reservoir seismic source arrays 240(1), 240(2) may be based on a target survey activity.

The firing heads of the shared-reservoir seismic source array system 1140 may be fired simultaneously a periodic interval. In another example, the firing heads of the shared-reservoir seismic source array 240(1) may be fired simultaneously at a first time and the firing heads of the shared-reservoir seismic source array 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads of the shared-reservoir seismic source arrays 240(1), 240(2).

In another example, a respective first firing head of each of the shared-reservoir seismic source arrays 240(1), 240(2) may be fired simultaneously at a first time and a respective second firing head of each of the shared-reservoir seismic source arrays 240(1), 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads of the shared-reservoir seismic source arrays 240(1), 240(2).

In another example, a respective first firing head of each of the shared-reservoir seismic source arrays 240(1), 240(2) may be fired sequentially with a first delay in between starting at a first time and a respective second firing head of each of the shared-reservoir seismic source arrays 240(1), 240(2) may be fired sequentially with the first delay in between starting at a second time following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(240(2).

In another example, the firing heads of the shared-reservoir seismic source array 240(1) may be fired sequentially with a first delay in between starting at a first time and the firing heads of the shared-reservoir seismic source array 240(2) may be fired sequentially with the first delay in between starting at a second time following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(1), 240(2).

Each of the shared-reservoir seismic source arrays 240(1), 240(2) may have a length of X meters to provide a first separation distance between respective firing heads. In addition, the pressure line 244 may have a length of at least Y meters to provide a second separation distance between the shared-reservoir seismic source arrays 240(1), 240(2). In some examples, the respective firing characteristics of the firing heads of each of the shared-reservoir seismic source arrays 240(1), 240(2), and the shared chamber volume and pressure of each of the shared chamber seismic source arrays 240(1), 240(2), and the first and second separation distances may be selected to achieve a particular effect between air bubbles fired from each of the firing heads.

In some examples, the first and/or second separation distances may be selected to achieve a desired effect between air bubbles fired from the firing heads of the shared-reservoir seismic source arrays 240(1), 240(2). For example, the first and/or second separation distances may be selected to result in the respective air bubbles coalescing when fired from the firing heads of the shared-reservoir seismic source arrays 240(1), 240(2). In another example, the first and/or second separation distances may be selected to result in the respective air bubbles interacting but not coalescing when fired from the firing heads of the shared-reservoir seismic source arrays 240(1), 240(2) In yet another example, the first and/or second separation distances may be selected to result in the respective air bubbles not interacting when fired from the firing heads of the shared-reservoir seismic source arrays 240(1), 240(2).

In some examples, the length of X meters and the length of Y meters are equal. In other examples, the length of X meters is shorter than the length of V meters. The length of X meters is at least 1 meter, in some examples. The length of X meters is 2 or more meters, in some examples. The length of X meters is approximately 2 meters, in some examples. The length of X meters is 5 or less meters in some examples. The length of meters is at least 1 meter, in some examples. The length of V meters is 2 or more meters, in some examples. The length of V meters is approximately 2 meters, in some examples. The length of V meters is more than 5 meters, in some examples. The lengths of X and V meters are both approximately 2 meters, in some examples.

In some examples, the shared reservoir of one or both of the shared-reservoir seismic source arrays 240(1), 240(2) may include one or more baffles (e.g., or one or more other physical chamber dividers) that are configured to divide the shared chamber into two or more separate chambers. The two or more separate chambers may be equal in volume, in some examples. In other examples, the two or more separate chambers may be different in volume. In yet other examples where the shared reservoir of one or both of the shared-reservoir seismic source arrays 240(1), 240(2) is divided into three or more separate chambers, the three or more separate chambers may include a combination of equal and different volumes.

In some examples, the one or more baffles (e.g., or one or more other physical chamber dividers) may include ports that may be selectively opened or closed based on a desired mode of operation, such as a first mode where the shared reservoir of one or both of the shared chamber seismic source arrays 240(1), 240(2) is operated as a single shared chamber, a second mode where the shared reservoir of one or both of the shared-reservoir seismic source arrays 240(1), 240(2) is split into two separate shared chambers, or other modes of operation where the shared reservoir of one or both of the shared-reservoir seismic source arrays 240(1), 240(2) is split into three or more separate shared chambers.

When the shared reservoir of one or both of the shared-reservoir seismic source arrays 240(1), 240(2) is divided into two or more different chambers, each individual chamber may be independently filled with compressed air to a respective pressure. The respective pressure stored in each of the two or more different chambers may be different, equivalent, or combinations thereof. In some examples, the pressure line 244 may couple a respective pair of divided chambers of the shared-reservoir seismic source arrays 240(1), 240(2).

Turning now to FIG. 11, the shared-reservoir seismic source array system 1140 may be are deployed using a depressor, ballast (weight) system or downforce foil 1020 and one or more steering foils 1030. The towing configuration 1101 is shown as being towed by the vessel 1004.

Figure 12:
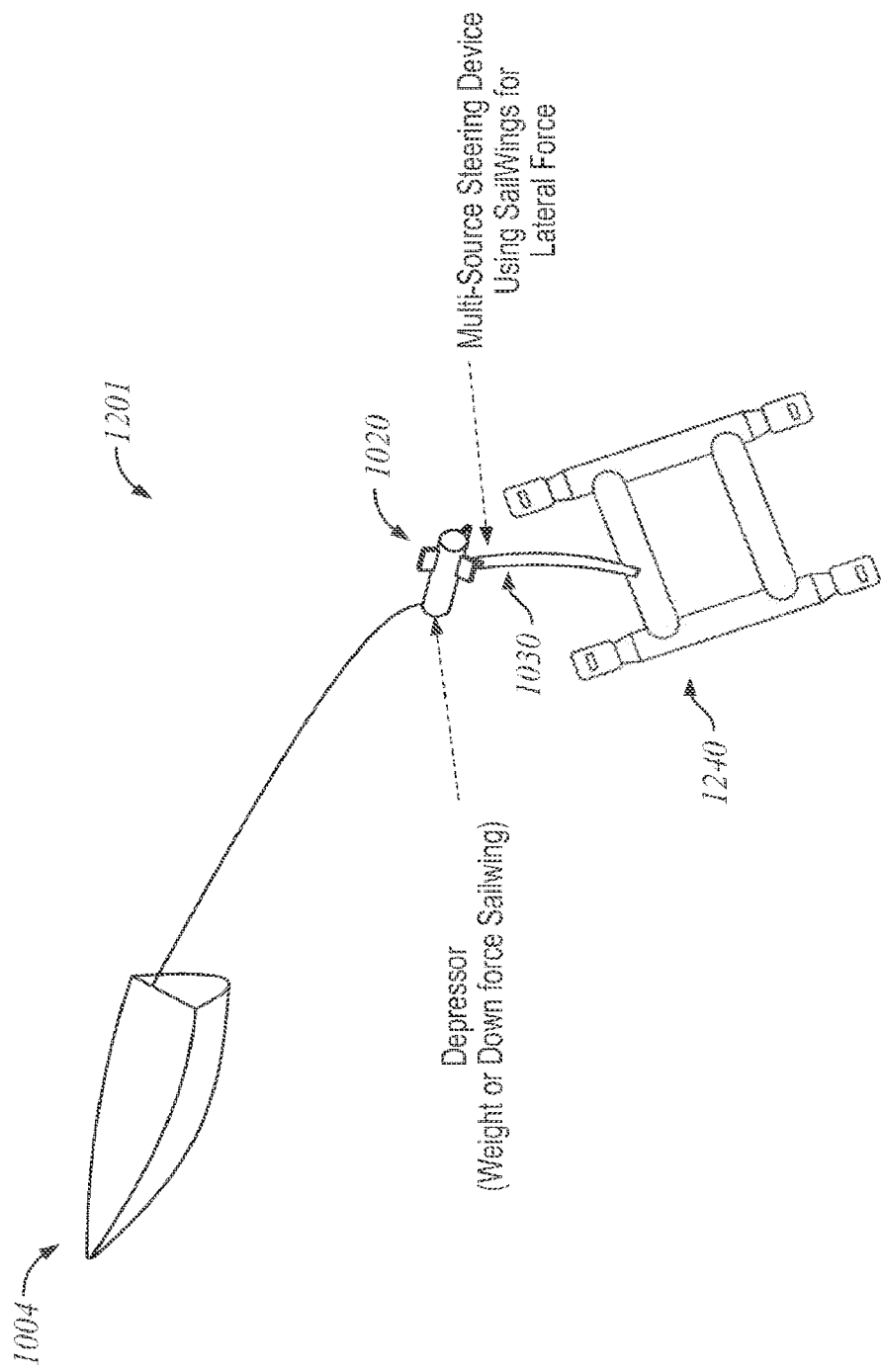
FIG. 12 is a schematic illustration of a representative towing configuration for a shared chamber seismic source array system in accordance with embodiments of the disclosure.

FIG. 12 is a schematic illustration of a representative towing configuration 1201 for a shared chamber seismic source array system 1240 in accordance with embodiments of the disclosure. The towing configuration 1201 may include elements that have been previously described with respect to the towing configurations 1001 of FIG. 10 and/or the towing configurations 1101 of FIG. 11. Some elements have been identified in FIG. 12 using the same reference numbers used in one or both of FIGS. 10 and 11, with operation of the common elements as previously described. In the interest of brevity, a detailed description of the structure and function of these elements need not be repeated.

Figure 15:
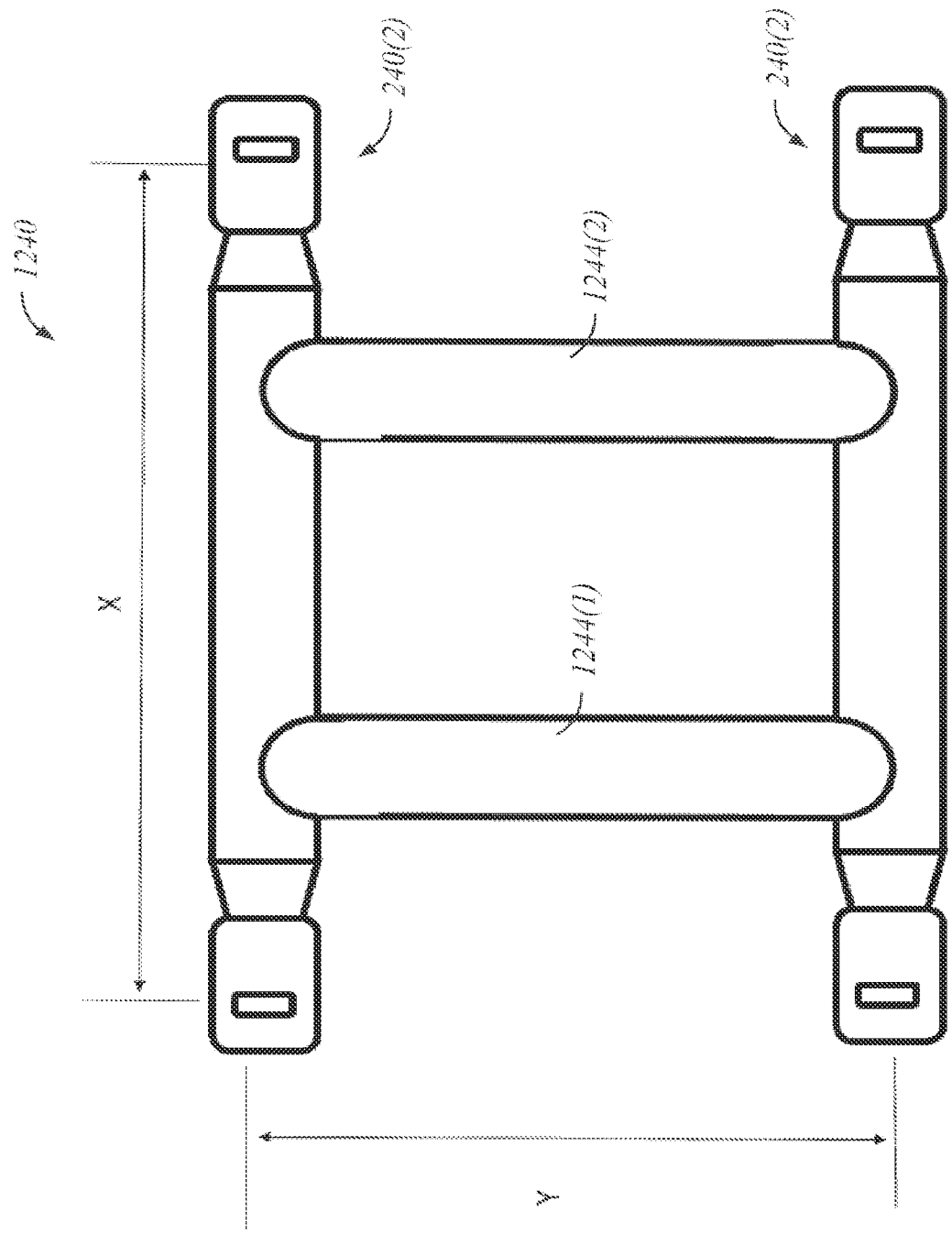
FIG. 15 includes a perspective view of a shared-reservoir seismic source array system in accordance with embodiments of the disclosure.

In some examples, the shared-reservoir seismic source arrays 125 of FIG. 1 may implement the shared-reservoir seismic source array system 1240. The shared-reservoir seismic source array system 1240 may include at least two shared-reservoir seismic source arrays. FIG. 15 includes a perspective view of a shared-reservoir seismic source array system 1240 in accordance with embodiments of the disclosure. In an example, the shared-reservoir seismic source array system 1240 may implement the shared-reservoir seismic source array system 1240 of FIG. 15.

As shown in FIG. 15, the shared-reservoir seismic source array system 1240 includes two shared-reservoir seismic source arrays 240(1), 240(2) coupled together via connection members 444(1), 444(2), The shared-reservoir seismic source array system 1240 may include elements that have been previously described with respect to the towing configuration 1001 of FIG. 10, or according to a shared-reservoir seismic source array system 1140 as shown in one or both of AGS. 11 and 14. Some elements have been identified in FIG. 15 using the same reference numbers in one or more of FIGS. 10, 11 and 14, with operation of common elements as previously described. In the interest of brevity, a detailed description of the structure and function of these elements need not be repeated.

The connection members 444(1), 444(2) serve to rigidly maintain a Y meter distance between the two shared-reservoir seismic source arrays 240(1), 240(2). While the shared chamber seismic source array system 1240 of FIG. 15 includes two of the connection members 444(1), 444(2), one connection member or more than one connection member may be included without departing from the scope of the disclosure.

In some examples, one or both of the connection members 444(1), 444(2) may include chambers to store compressed air, and may be configured to provide the stored compressed air to one or both of the shared chambers of the shared-reservoir seismic source arrays 240(1), 240(2). That is, one or both of the connection members 444(1), 444(2) may connect to a port in one or both of the shared chambers of the shared-reservoir seismic source arrays 240(1), 240(2). The connection may include respective valve assemblies that may be configured to control (e.g., manually, automatically, according to a defined sequence, simultaneously, sequentially, etc.) release of compressed air from a respective one of the connection members 444(1), 444(2) to a respective shared reservoir of one or both of the shared-reservoir seismic source arrays 240(1), 240(2).

In some examples, the chamber of one or both of the connection members 444(1), 444(2) may include one or more baffles (e.g., or one or more other physical chamber dividers) that are configured to divide the shared chamber into two or more separate chambers. The two or more separate chambers may be equal in volume, in some examples. In other examples, the two or more separate chambers may be different in volume. In yet other examples the chamber of one or both of the connection members 444(1), 444(2) are divided into three or more separate chambers, the three or more separate chambers may include a combination of equal and different volumes.

In some examples, the one or more baffles (e.g., or one or more other physical chamber dividers) may include ports that may be selectively opened or closed based on a desired mode of operation, such as a first mode where the chamber of one or both of the connection members 444(1), 444(2) is operated as a single shared chamber, a second mode where the chamber of one or both of the connection members 444(1), 444(2) is split into two separate shared chambers, or other modes of operation where the chamber of one or both of the connection members 444(1), 444(2) is split into three or more separate shared chambers.

When the chamber of one or both of the connection members 444(1), 444(2) is divided into two or more different chambers, each individual chamber may be independently filled with compressed air to a respective pressure. The respective pressure stored in each of the two or more different chambers may be different, equivalent, or combinations thereof. In some examples, each of the connection members 444(1), 444(2) may couple a respective pair of divided chambers of the shared-reservoir seismic source arrays 240(1), 240(2).

In an example, one or both of the connection members 444(1), 444(2) may include a respective chamber or line to couple the shared chambers of the shared-reservoir seismic source arrays 240(1), 240(2) in order to equalize pressure between the respective shared chambers of the shared-reservoir seismic source arrays 240(1), 240(2).

In some examples, the shared-reservoir seismic source array system 1240 may be controlled to achieve specific firing sequences. For example, the firing heads of each the shared chamber seismic source arrays 240(1), 240(2) may be fired simultaneously, sequentially or staggered (with a controlled delay between each firing), asynchronously, or any combination thereof. The selected firing sequence for the shared-reservoir seismic source arrays 240(1), 240(2) may be based on a target survey activity.

The firing heads of the shared-reservoir seismic source array system 1240 may be fired simultaneously a periodic interval. In another example, the firing heads of the shared-reservoir seismic source array 240(1) may be fired simultaneously at a first time and the firing heads of the shared-reservoir seismic source array 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads of the shared-reservoir seismic source arrays 240(1), 240(2).

In another example, a respective first firing head of each of the shared-reservoir seismic source arrays 240(1), 240(2) may be fired simultaneously at a first time and a respective second firing head of each of the shared-reservoir seismic source arrays 240(1), 240(2) may be fired simultaneously at a second time following the first time by a delay. The delay may be between and including 0.5 and 5 seconds, in some examples. In some examples, the delay may be 0.5, 1, 2 or 5 seconds. The delay may be selected caused a desired effect between air bubbles generated by the respective firing heads of the shared-reservoir seismic source arrays 240(1), 240(2).

In another example, a respective first firing head of each of the shared-reservoir seismic source arrays 240(1), 240(2) may be fired sequentially with a first delay in between starting at a first time and a respective second firing head of each of the shared-reservoir seismic source arrays 240(1), 240(2) may be fired sequentially with the first delay in between starting at a second time following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(1), 240(2).

In another example, the firing heads of the shared-reservoir seismic source array 240(1) may be fired sequentially with a first delay in between starting at a first time and the firing heads of the shared-reservoir seismic source array 240(2) may be fired sequentially with the first delay in between starting at a second time following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared reservoir of each of the each of the shared-reservoir seismic source arrays 240(1), 240(2).

Each of the shared-reservoir seismic source arrays 240(1), 240(2) may have a length of X meters to provide a first separation distance between respective firing heads. In addition, the connection members 444(1), 444(2) may have a length of at least Y meters to provide a second separation distance between the shared-reservoir seismic source arrays 240(1), 240(2). In some examples, the respective firing characteristics of the firing heads of each of the shared-reservoir seismic source arrays 240(1), 240(2), and the shared chamber volume and pressure of each of the shared-reservoir seismic source arrays 240(1), 240(2), and the first and second separation distances may be selected to achieve a particular effect between air bubbles fired from each of the firing heads.

In some examples, the first and/or second separation distances may be selected to achieve a desired effect between air bubbles fired from the firing heads of the shared-reservoir seismic source arrays 240(1), 240(2). For example, the first and/or second separation distances may be selected to result in the respective air bubbles coalescing when fired from the firing heads of the shared-reservoir seismic source arrays 240(1), 240(2). In another example, the first and/or second separation distances may be selected to result in the respective air bubbles interacting but not coalescing when fired from the firing heads of the shared-reservoir seismic source arrays 240(1), 240(2) In yet another example, the first and/or second separation distances may be selected to result in the respective air bubbles not interacting when fired from the firing heads of the shared-reservoir seismic source arrays 240(1), 240(2).

In some examples, the length of X meters and the length of Y meters are equal. In other examples, the length of X meters is shorter than the length of V meters. The length of X meters is at least 1 meter, in some examples. The length of X meters is 2 or more meters, in some examples. The length of X meters is approximately 2 meters, in some examples. The length of X meters is 5 or less meters in some examples. The length of V meters is at least 1 meter, in some examples. The length of V meters is 2 or more meters, in some examples. The length of V meters is approximately 2 meters, in some examples. The length of V meters is more than 5 meters, in some examples. The lengths of X and V meters are both approximately 2 meters, in some examples.

Turning now to FIG. 12, the shared-reservoir seismic source array system 1240 may be are deployed using a depressor, ballast (weight) system or downforce foil 1020 and one or more steering foils 1030. The towing configuration 1201 is shown as being towed by the vessel 1004.

Figure 13:
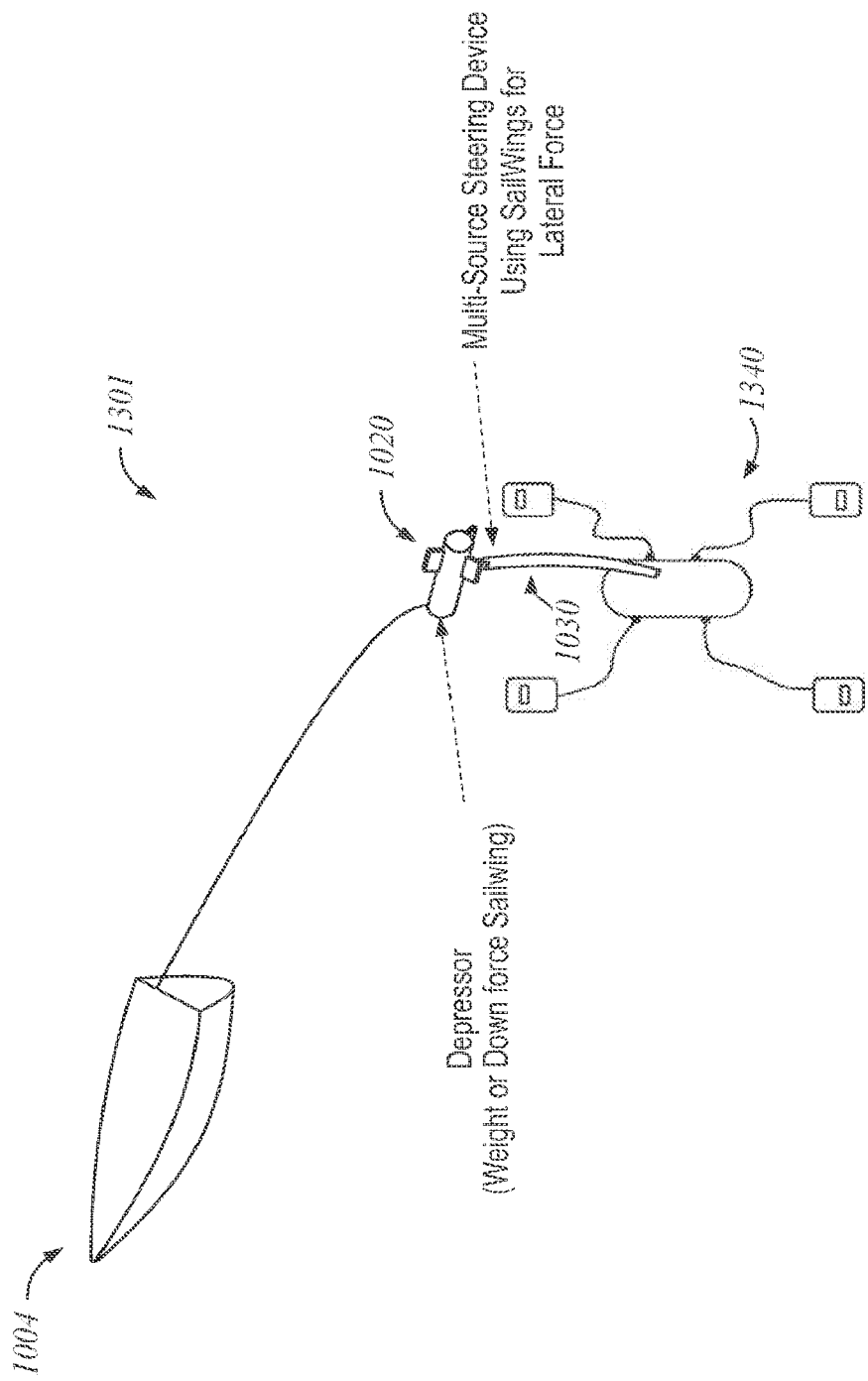
FIG. 13 is a schematic illustration of a representative towing configuration for a shared chamber seismic source array system in accordance with embodiments of the disclosure.

FIG. 13 is a schematic illustration of a representative towing configuration 1301 for a shared chamber seismic source array system 1340 in accordance with embodiments of the disclosure. The towing configuration 1301 may include elements that have been previously described with respect to the towing configurations 1001 of FIG. 10, the towing configurations 1101 of FIG. 11, and/or the towing configurations 1201 of FIG. 12. Some elements have been identified in FIG. 13 using the same reference numbers in one or more of FIGS. 10, 11 and 12, with operation of common elements as previously described. In the interest of brevity, a detailed description of the structure and function of these elements need not be repeated.

Figure 16:
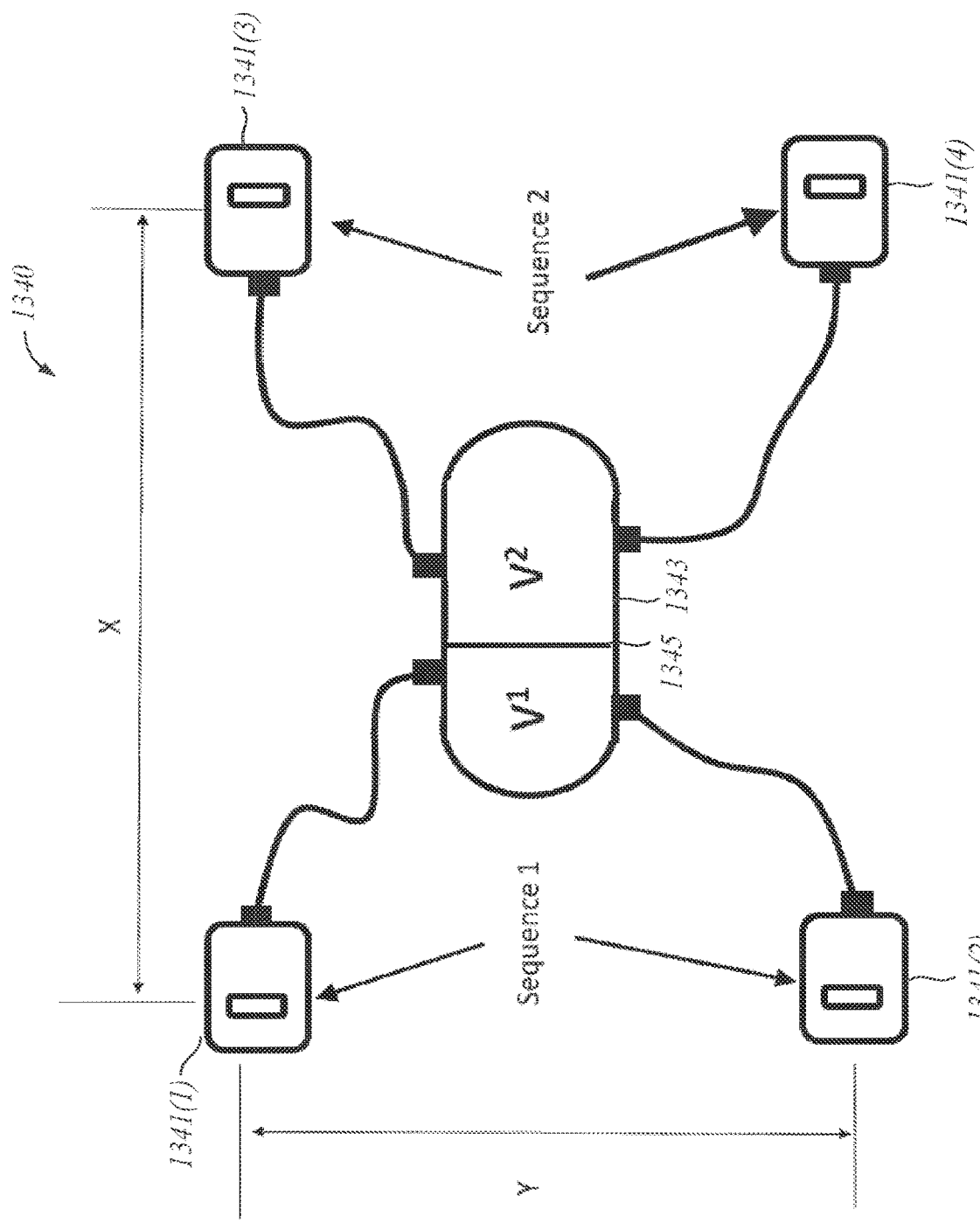
FIG. 16 includes a perspective view of a shared-reservoir seismic source a system in accordance with embodiments of the disclosure.

In some examples, the shared-reservoir seismic source arrays 125 of FIG. 1 may implement the shared-reservoir seismic source array system 1340. The shared-reservoir seismic source array system 1340 may include a shared chamber coupled to a set of firing heads. FIG. 16 includes a perspective view of a shared-reservoir seismic source array system 1340 in accordance with embodiments of the disclosure. In an example, the shared-reservoir seismic source array system 1340 may implement the shared-reservoir seismic source array system 1340 of FIG. 15.

Turning now to FIG. 16, the shared-reservoir seismic source array system 1340 includes firing heads 1341(1)-1341(4) coupled to a shared chamber 1343 via respective pressure lines. Each of the firing heads 1341(1)-1341(4) may include a respective housing with one or more outlet ports, a respective solenoid valve assembly, a respective fire chamber, or any combination thereof. The one or more outlet ports may include one or more annular ports, in some examples. The shared chamber 1343 may serve as a shared a reservoir chamber (e.g., tire chamber) for each of the firing heads 1341(1)-1341(4). The firing heads 1341(1)-1341(4) may be in pressure communication with the shared reservoir 1343 to provide compressed air from an outlet port during a firing sequence. The shared reservoir 1343 in pressure communication with firing heads 1341(1)-1341(4) can be provided as a gland type, a solid design, and/or with a radiused, threaded shaft shuttle and shuttle bearing.

Each of the firing heads 1341(1)-1341(4) may have respective firing characteristics, such as a single outlet port, more than one outlet port, a fixed air bubble volume, a configurable air bubble volume, a fixed firing pressure, a configurable firing pressure, a minimum recovery time between firings, or any combination thereof. In some examples, the respective firing characteristics of the firing heads 1341(1)-1341(4) may all be equivalent. In some examples, the respective firing characteristics of the firing heads 1341(1)-1341(4) may all be different. In some examples, the respective firing characteristics of the firing heads 1341(1)-1341(4) may include combinations of equivalent and different respective firing characteristics.

The thing heads 1341(1)-1341(4) may include individual control components (e.g., and/or the shared chamber seismic source array system 1340 includes control circuitry) to allow each of the firing heads 1341(1)-1341(4) to be independently fired. That is, firing heads 1341(1)-1341(4) may be fired simultaneously, sequentially or staggered (with a controlled delay between each firing), asynchronously, or any combination thereof. The control components and/or control circuitry may be configured to determine firing timing based on signals received via wired or wireless communication circuitry (e.g., from a towing or other vessel, control components of the other firing head, from another shared chamber seismic source array, etc., or combinations thereof), based on internal timing circuitry and programmed timing configurations or parameters, or any combination thereof.

The control components may include electronic activation components, mechanical activation components, or any combination thereof. For example, the firing of the firing heads 1341(1)-1341(4) may be intentionally staggered, such as to account for delays in transmission or response times of different types of heads or to achieve a certain desired interaction between bubbles formed when the firing heads 1341(1)-1341(4) are fired. That is, the seismic energy (e.g., including a frequency spectrum) generated by the shared-reservoir seismic source array 1340 may be based on the separation distance between the firing heads 1341(1)-1341(4), the relative compressed air discharge timing, and compressed air discharge volume provided from each of the firing heads 1341(1)-1341(4).

The firing sequence implemented for the firing heads 1341(1)-1341(4) may be shared-reservoir seismic source array system 1340 may be based on a target survey activity. For example, the firing heads 1341(1)-1341(4) may be fired simultaneously a periodic interval. In another example, one pair of the firing heads 1341(1)-1341(4) may be fired simultaneously at a first time and another pair of the firing heads 1341(1)-1341(4) may be fired simultaneously at a second time following the first time by a delay. The delay may be between and including 0.5 and 5 seconds, in some examples. In some examples, the delay may be 0.5, 1, 2 or 5 seconds. The delay may be selected to cause a desired effect between air bubbles generated by the firing heads 1341(1)-1341(4).

In another example, the pair of firing heads 1341(1), 1341(2) may be fired sequentially with a first delay in between starting at a first time (e.g., first sequence) and the pair of firing heads 1341(3), 1341(4) may be fired sequentially with the first delay in between starting at a second time (e.g., first sequence) following the first time by a second delay. The first delay may be shorter than the second delay. The first delay may be between and including 0.5 and 5 seconds, in some examples. In some examples, the delay may be 0.5, 1, 2 or 5 seconds. The first delay and/or the second delay may be selected to cause a desired effect between air bubbles generated by the respective firing heads. The second delay may be based on recovery time associated with the shared chamber 1343.

In another example, the firing heads 1341(1)-1341(4) may be fired sequentially with a first delay in between each discharge. The delay may be between and including 0.5 and 5 seconds, in some examples. In some examples, the delay may be 0.5, 1, 2 or 5 seconds. The delay may be selected caused a desired effect between air bubbles generated by the firing heads 1341(1)-1341(4). The delay may be based on recovery time associated with the shared chamber 1343.

The firing heads 1341(1)-1341(4) may be attached or connected to the shared chamber 1343 via respective pressure lines. Each of the firing heads 1341(1)-1341(4) may couple to a respective outlet port of the shared chamber 1343 to receive compressed air. The housing of the shared chamber 1343 may include an inlet port to receive compressed air from a compressed air source for refilling between firing sequences.

The arrangement of the firing heads 1341(1)-1341(4) may be such that the firing heads 1341(1) and (3) and the firing heads 1341(2) and (4) are separated by a length of X meters to provide a first separation distance, and the firing heads 1341(1) and (2) and the firing heads 1341(3) and (4) are separated by a length of Y meters to provide a second separation distance. In some examples, the respective firing characteristics of each of the firing heads 1341(1)-1341(4), and the volume and/or pressure of the shared chamber 1343, and/or the first and/or second separation distances may be selected to achieve a particular effect between air bubbles fired from each of the firing heads 1341(1)-1341(4).

In some examples, the first and/or separation distances may be selected to achieve a desired effect between airs bubbles fired from the firing heads 1341(1)-1341(4). For example, the first and/or separation distances may be selected to result in the respective air bubbles coalescing when fired from the firing heads 1341(1)-1341(4). In another example, the first and/or separation distances may be selected to result in the respective air bubbles interacting but not coalescing when fired from the firing heads 1341(1)-1341(4). In yet another example, the first and/or separation distances may be selected to result in the respective air bubbles not interacting when fired from the firing heads 1341(1)-1341(4).

In some examples, the length of X meters and the length of meters are equal. In other examples, the length of X meters is shorter than the length of Y meters. The length of X meters is at least 1 meter, in some examples. The length of X meters is 2 or more meters, in some examples. The length of X meters is approximately 2 meters, in some examples. The length of X meters is 5 or less meters in some examples. The length of Y meters is at least 1 meter, in some examples. The length of Y meters is 2 or more meters, in some examples. The length of Y meters is approximately 2 meters, in some examples. The length of Y meters is more than 5 meters, in some examples. The lengths of X and Y meters are both approximately 2 meters, in some examples.

In some examples, the shared chamber 1343 may include one or more baffles (e.g., or one or more other physical chamber dividers) that are configured to divide the chamber into two or more separate chambers, such as baffle 1345 that divides the shared chamber 1343 into the V1 and V2 chambers (e.g., sub-chambers), as depicted in FIG. 16. While FIG. 16 depicts the shared chamber 1343 with a single baffle 1345, the shared chamber 1343 may include no baffle or may include more than one baffle to divide the shared chamber 1343 into more than two chambers without departing from the scope of the disclosure. The two or more separate chambers (e.g., the V1 and V2 chambers) may be equal in volume, in some examples. In other examples, the two or more separate chambers (e.g., the V1 and V2 chambers) may be different in volume. In yet other examples where the shared chamber 1343 is divided into three or more separate chambers, the three or more separate chambers may include a combination of equal and different volumes.

In some examples, the one or more baffles (e.g., or one or more other physical chamber dividers), such as the baffle 1345, may include ports that may be selectively opened or closed based on a desired mode of operation, such as a first mode where the shared chamber 1343 is operated as a single shared chamber, a second mode where the shared chamber 1343 is split into two separate shared chambers (e.g., the V1 and V2 chambers), or other modes of operation where the shared chamber 1343 is split into three or more separate shared chambers.

When the shared chamber 1343 is divided into two or more different chambers (e.g., the V1 and V2 chambers), each individual chamber may be independently filled with compressed air to a respective pressure. The respective pressure stored in each of the two or more different chambers (e.g., the V1 and V2 chambers) may be different, equivalent, or combinations thereof.

Turning now to FIG. 13, the shared-reservoir seismic source array system 1340 may be are deployed using a depressor, ballast (weight) system or downforce foil 1020 and one or more steering foils 1030. The towing configuration 1301 is shown as being towed by the vessel 1004.

Using the single-chamber seismic source arrays and array systems depicted in one or more of FIGS. 10-16 may enable described methods for testing at low frequencies. The described method for testing at low frequencies (e.g., 1 to 4 Hz) may improve velocity model building using full waveform inversion (FWI). The improvement in velocity model building using FWI may include using the Rayleigh-Willis equation, using a deep tow implementation to take advantage of constructive ghost energy, increase signal-to-noise ratio by firing the firing heads more frequently, simplifying the single-chamber seismic source arrays for improved low frequency energy, or any combination of elements above.

One potential limitation in using the previously discussed Rayleigh-Willis formula to select frequency, depth, and time parameters for a single-chamber seismic source array and array system arrangement and firing in a seismic sensing system is that the resulting peak bubble frequency may be limited to approximately 3.5 Hz or 285 milliseconds. As previously discussed, towing the single-chamber seismic source arrays and array systems deep may result in low frequency uplift based on a depth of towing the single-chamber seismic source arrays and array systems, which may provide a notched frequency spectrum with a lowest frequency lobe in a range of 1-5 Hz. However, in some embodiments, the system may be configured to create pulses on top of the base spectrum to provide additional uplift in discrete frequencies.

For example, the system may include one or more of the single-chamber seismic source arrays and array systems according to any of FIGS. 10-16; e.g., with multiple firing heads located physically proximate one another, each individual firing head may fire at constant intervals. As each firing head fires at the constant interval, the resulting spike will synthesize with frequencies of signals generated from the single firing head spectrum. That is, the firing of multiple firing heads at the constant intervals may result in an uplift to the discrete frequency defined by the constant interval. In some examples, the uplift may be 10 dB or more. The constant interval/frequency may be 1 second/1 Hz, 2 seconds/0.5 Hz, or another constant interval/frequency. Using multiple firing heads pulsed at constant intervals may synthesize an extended time delay between pulses and bypass a bubble period derived from the Rayleigh-Willis formula. The single-chamber seismic source arrays and array systems of FIGS. 10-16 may be towed at depths from 0 to 150 meters, or at different (greater) depth.

In some examples, the single-chamber seismic source arrays and array systems of FIGS. 10-16 may be towed at 10 meters or 130 meters, or between 10 and 130 meters. The single-chamber seismic source arrays and array systems of FIGS. 10-16 may operate at pressures between 1000 and 3000 PSI, in some examples.

Noise

Noise is a substantial consideration in seismic surveys. Noise sources include swell noise and wave noise from the sea surface, and towing noise generated by the streamer cables traveling through the water column. Noise propagates both through the water column, and also along the streamers.

Noise contributions can sometimes be reduced with a combination of temporal and spatial filtering. Temporal filtering is accomplished by discrete digital sampling of the sensor signals, and weighting the samples acquired as a function of time. Analog filters can be used to prevent aliasing of signals at frequencies greater than half the sample rate.

Spatial samples are typically formed by group summing of the individual sensor outputs, so that noise propagating along the length of the streamer is attenuated. Noise components that propagate orthogonal to the streamer axis, however, may not be affected.

The acoustic impedance pc is the product of the density p of the water column (or other acoustic medium), and the speed c of acoustic wave propagation in the medium. Acoustic energy reflects when there is a change in the impedance, not only due to the subsurface structures but also when the sound waves encounter the water/air interface along the upper surface boundary, and at the ocean bottom. Energy that is not reflected is transmitted (or refracted) beyond the boundary, as defined between the two regions of different acoustic impedance.

Acoustic waves propagate through water and other media in the form of pressure waves or compression waves, which induce particle motion in the direction of propagation. At a planar interface between two different homogenous media, the acoustic waves reflect at an angle equal to the angle of incidence 81, and refract at angle 82 given by $$\sin \theta_2 = c_2 \sin \theta_1 / c_1 \quad (3)$$

as defined for acoustic waves travelling from a first medium (1) with propagation velocity $c_1$ to a second medium (2) with propagation velocity $c_2$. If the incident angle $\theta_1$ is zero, then the reflected energy propagates back through the first medium along the same incident path, and the refracted waves propagate forward through the second medium at angle $\theta_2=0$.

For an incident angle $\theta_1$ of zero and no conversion to shear energy, the reflection coefficient is:

$$R_{pp} = \frac{\rho_2 c_2 - \rho_1 c_1}{\rho_2 c_2 + \rho_1 c_1} \quad (4)$$

The sea surface can be a near perfect reflector of sound energy, with a reflection coefficient of approximately 1 at the water-air interface ($R_{pp} \approx 1$). After reflecting from the seafloor and subsurface structures of interest, the acoustic energy thus propagates upward through the water column to the surface, and reflects back again down toward the sensors.

The sensors detect a ghost response from the downward-propagating acoustic waves reflected from the sea surface. The "ghost" signal arrives delayed in time from the upward propagating wavefield, and is reversed in polarity. The downward-propagating ghost wave adds to the upward-propagating signal, affecting reconstruction of the seismic image. The ghost reflection can also travel back down to the seafloor (or other interface), and then reflect back upward to produce additional reflected signals, commonly referred to as multiples.

For a vertically traveling pressure wave, the ghost produces a "notch" in the frequency spectrum a frequency $f_{notch}=c/2d$, where c is the acoustic velocity and d is the streamer depth. For typical streamer depths d on the order of 10 m, the notch frequency is $f_{notch} \sim 75$ Hz; thus, a frequency response extending beyond about 100 Hz can be required for high-quality seismic image resolution.

Because the notch frequency is inversely proportional to the tow depth, streamers can be towed at shallower depths to improve resolution. Shallow depths can problematic, however, due to noise from the sea surface interfering with the seismic signal. These effects may worsen as the weather deteriorates, sometimes causing the crew to discontinue operations until conditions improve. Reducing ghost-notch effects enables towing at greater depths, farther from surface disturbances.

Ocean bottom systems can reject ghosts and multiples by a technique commonly known as p-z summation. In an acoustic wave, the pressure p is a scalar, while the particle velocity u is a vector quantity. A hydrophone with positive omnidirectional response records the seismic acoustic wave pressure p, and a geophone or accelerometer records the velocity u, including the vertical component $u_z$, which has a positive response to up-going signals and a negative response to down-going signals.

In p-z summation, the velocity signal is scaled by the acoustic impedance pc of the seawater (or other acoustic medium), and added to the pressure signal. A single-axis sensor can also be used, e.g., by scaling to account for the change in sensitivity due to the off-axis arrival direction of the signal. For example, an accelerometer output signal can be integrated to obtain the velocity, or the hydrophone signal can be differentiated to spectrally match the accelerometer. This produces a compound sensor design, with full response to the upward-traveling wave and at least a partially muted response to the downward-traveling wave, in order to reject ghosts and multiples.

Techniques like p-z summation can also be applied to towed-streamer acquisition, allowing for greater tow depths with less interference from ghost-notch reflections. Streamers, however, can also experience acceleration due to towing and sea surface effects. These effects may be substantial compared to the acceleration signal from the reflected seismic wavefield, and may fall into the same spectral band of interest, along with the desired reflection response.

The towing speed of the streamer can also be perturbed when the tow vessel encounters ocean waves, which typically introduce a yawing motion as well. Much of the vessel's acceleration energy can be attenuated by deploying the streamers with elastic tow lines, but some of the energy can still be transmitted along the streamer cables, producing noise contributions in the seismic data.

Performance of a particle-velocity measuring system should be near the ambient noise limits. The acceleration (a) due to a planar pressure wave (e.g., from a reflected seismic signal) can be given by:

$$a = \frac{p \times 2\pi f}{Z} \quad (5)$$

where p is the acoustic sound pressure level, f is the frequency, and Z is the acoustic impedance of the medium. The presence of secondary peaks in the acceleration signal indicates that, in some cases, the cable dynamic motion can be greater than the seismic signal to be measured. While this problem has been identified in the prior art, there remains a need for improved seismic survey techniques that produce high-fidelity sampling of the reflected seismic wavefield, with good signal-to-noise ratio down to the lowest frequencies of interest.

While this disclosure is directed to representative embodiments, other examples may be encompassed without departing from the scope of disclosure, as determined by the claims. While embodiments of the disclosure may be described with respect to particular exemplary embodiments, it is understood that changes can be made and equivalents may be substituted to adapt the disclosure to different problems and application, while remaining within the spirit and scope of the disclosure as claimed. The disclosure is not limited to the particular examples that are described, but encompasses all embodiments falling within the scope of the claims.

In view of the foregoing, the scope of the present disclosure is determined by the claims that follow.

We claim:

1. A seismic source comprising:
    a reservoir configured to hold compressed gas;
    a first firing head coupled to the reservoir, the first firing head configured to generate seismic energy by releasing a first portion of the compressed air from the reservoir to form a first gas bubble in a seismic medium; and
    a second firing head coupled to the reservoir, the second firing head configured to generate seismic energy by releasing a second portion of the compressed gas from the reservoir to form a second gas bubble in the seismic medium,
    wherein the reservoir comprises a baffle dividing the reservoir into a first sub-chamber containing the first portion of the compressed gas and a second sub-chamber containing the second portion of the compressed gas, and
    wherein the baffle comprises a pressure regulation feature for equalizing pressures in the first and second sub-chambers.

2. The seismic source of claim 1, wherein the pressures in the first and second sub-chambers are maintained at a substantially equal pressure.

3. The seismic source of claim 1, wherein the pressure regulation feature defines an aperture that fluidly connects the first and second sub-chambers.

4. The seismic source of claim 1, wherein the pressure regulation feature comprises a valve that fluidly connects the first and second sub-chambers.

5. The seismic source of claim 1, wherein the reservoir comprises a cylindrical housing, wherein the first and second firing heads are disposed on opposite ends of the cylindrical housing.

6. The seismic source of claim 1, wherein the first and second firing heads are separated by a distance of at least one meter.

7. The seismic source of claim 6, wherein the distance separating the first and second firing heads is less than three meters.

8. A seismic source comprising:
    a reservoir configured to hold compressed gas;
    a first firing head coupled to the reservoir, the first firing head configured to generate seismic energy by releasing a first portion of the compressed gas from the reservoir to form a first gas bubble in a seismic medium; and
    a second firing head coupled to the reservoir, the second firing head configured to generate seismic energy by releasing a second portion of the compressed gas from the reservoir to form a second gas bubble in the seismic medium,
    wherein the first and second firing heads are separated by a distance of at least one meter.

9. The seismic source of claim 8, wherein the distance separating the first and second firing heads is less than three meters.

10. The seismic source of claim 8, wherein the reservoir comprises a cylindrical housing, wherein the first and second firing heads are coupled to opposite ends of the cylindrical housing.

11. The seismic source of claim 10, wherein the reservoir comprises respective ports disposed at the opposite ends for receiving compressed gas to refill the reservoir.

12. The seismic source of claim 10, wherein a length of the cylindrical housing is at least one meter.

13. The seismic source of claim 8, wherein the reservoir comprises insulation mechanisms to mitigate heat transfer between the reservoir and the water in which the seismic source is submerged,
    wherein at least one sensor is mounted onto the reservoir for measuring an environmental condition.

14. A method, comprising:
    generating seismic energy using a first firing head by releasing a first portion of compressed air stored in a reservoir to form a first gas bubble in a seismic medium; and
    generating seismic energy using a second firing head by releasing a second portion of compressed air stored in the reservoir to form a second gas bubble in the seismic medium,
    wherein the reservoir comprises a baffle dividing the reservoir into a first sub-chamber containing the first portion of the compressed gas and a second sub-chamber containing the second portion of the compressed gas, and
    wherein the baffle comprises a pressure regulation feature for equalizing pressures in the first and second sub-chambers.

15. The method of claim 14, wherein the pressures in the first and second sub-chambers are maintained at a substantially equal pressure.

16. The method of claim 14, further comprising:
    towing a sensor system through the seismic medium, the sensor system comprising the first and second firing heads, the reservoir, a control plate, suspension means configured to connect the control plate to at least one of the first firing head, the second firing head, or the reservoir, and a cable bundle coupled at a first end to the control plate and at a second end to at least one of the first firing head, the second firing head, or the reservoir, wherein the cable bundle comprises an electrical wire and a high pressure hose for refiling the reservoir.

17. The method of claim 16, wherein the sensor system further comprises:
a second cable bundle coupled at a third end to the control plate and at a fourth end to at least one of the first firing head, the second firing head, or the reservoir, the second cable bundle comprising a second electrical wire and a second high pressure hose for refiling the reservoir, wherein the second high pressure hose is coupled to a first end of the reservoir and the high pressure hose is coupled to a second end of the reservoir that is opposite the first end.

18. The method of claim 14, wherein the sensor system further comprises:
a tow bridle coupled to the control plate and at least one of the first firing head, the second firing head, or the reservoir, wherein the tow bridle is configured to couple to an umbilical cord that tows the sensor system behind a tow vessel.

* * * * *